(12) United States Patent
Boyer et al.

(10) Patent No.: US 10,198,456 B1
(45) Date of Patent: Feb. 5, 2019

(54) SYSTEMS AND METHODS FOR DATA ACCURACY IN A POSITIONING SYSTEM DATABASE

(71) Applicant: Verizon Patent and Licensing Inc., Basking Ridge, NJ (US)

(72) Inventors: Wesley Boyer, Washington, DC (US); Michael Chasen, Potomac, MD (US); Victor Quinn, Arlington, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 433 days.

(21) Appl. No.: 15/004,092

(22) Filed: Jan. 22, 2016

Related U.S. Application Data

(60) Provisional application No. 62/271,905, filed on Dec. 28, 2015.

(51) Int. Cl.
*G06F 17/00* (2006.01)
*G06F 17/30* (2006.01)

(52) U.S. Cl.
CPC .. *G06F 17/30241* (2013.01); *G06F 17/30247* (2013.01)

(58) Field of Classification Search
None
See application file for complete search history.

(56) References Cited

U.S. PATENT DOCUMENTS

| | | | | |
|---|---|---|---|---|
| 9,019,266 B2* | 4/2015 | Hoguet | ............... | G06Q 10/06 |
| | | | | 345/419 |
| 9,746,342 B2* | 8/2017 | Beyeler | ............ | G01C 21/3682 |
| 2005/0177350 A1* | 8/2005 | Kishikawa | .......... | G06F 17/5004 |
| | | | | 703/1 |
| 2007/0110338 A1* | 5/2007 | Snavely | ............ | G06F 17/30274 |
| | | | | 382/305 |
| 2011/0064312 A1* | 3/2011 | Janky | .................... | G01C 15/00 |
| | | | | 382/195 |
| 2011/0143707 A1* | 6/2011 | Darby, Jr. | ......... | G06F 17/30265 |
| | | | | 455/404.2 |
| 2011/0242311 A1* | 10/2011 | Miyajima | .......... | G01C 21/3602 |
| | | | | 348/116 |
| 2011/0242319 A1* | 10/2011 | Miyajima | .......... | G01C 21/3647 |
| | | | | 348/148 |
| 2011/0246027 A1* | 10/2011 | Miyajima | .......... | G01C 21/3647 |
| | | | | 701/41 |
| 2011/0279452 A1* | 11/2011 | Ibe | .................... | G01C 21/3638 |
| | | | | 345/419 |

(Continued)

*Primary Examiner* — Truc M Do

(57) ABSTRACT

Methods for improving data accuracy in a positioning system database are provided. In one aspect, a method includes obtaining an image of a building including a business, and receiving from a user a first identifier in the image of a first edge of the business. The first identifier is associated with a first axis heading in the direction of the first edge of the business. The method also includes receiving from the user a second identifier of a second edge of the business, the second identifier associated with a second axis, receiving from the user a third identifier of an entrance to the business, the third identifier associated with a third axis, and identifying first, second, and third points on the first, second, and third axes, respectively, to identify the first edge, the second edge, and the entrance of the business on the map. Systems and machine-readable media are provided.

20 Claims, 19 Drawing Sheets

(56) References Cited

U.S. PATENT DOCUMENTS

| | | | |
|---|---|---|---|
| 2012/0237083 A1* | 9/2012 | Lange | G06K 9/00805 |
| | | | 382/103 |
| 2012/0262552 A1* | 10/2012 | Zhang | G06F 17/30855 |
| | | | 348/47 |
| 2013/0103301 A1* | 4/2013 | Becker | G01S 13/867 |
| | | | 701/409 |
| 2013/0169685 A1* | 7/2013 | Lynch | G01C 21/3635 |
| | | | 345/634 |
| 2014/0313287 A1* | 10/2014 | Qi | G01C 21/3647 |
| | | | 348/43 |
| 2015/0045058 A1* | 2/2015 | Rudow | H04M 1/72572 |
| | | | 455/456.1 |
| 2016/0035096 A1* | 2/2016 | Rudow | G01S 19/25 |
| | | | 348/135 |

\* cited by examiner

SYSTEMS AND METHODS FOR DATA ACCURACY IN A POSITIONING SYSTEM DATABASE

CROSS-REFERENCE TO RELATED APPLICATIONS

The present application claims the benefit of priority under 35 U.S.C. § 119 from U.S. Provisional Patent Application Ser. No. 62/271,905, entitled "Improving Data Accuracy in a Positioning System Database" filed on Dec. 28, 2015, the disclosure of which is hereby incorporated by reference in its entirety for all purposes.

BACKGROUND

Field

The present disclosure generally relates to improving the accuracy of data used by a data processing system for providing a position in multi-dimensional space.

Description of the Related Art

A person looking for a location of a building commonly uses a web mapping service to find the location of the building. Web mapping services commonly provide street maps, views of streets, and route planning for traveling. Such web mapping services may provide accurate positional data for streets and plots of land, but often lack data accuracy for buildings and business locations and their storefronts in those buildings.

For example, with reference to prior art FIG. 1A, which provides an example illustration 10 of a street map with businesses from a web mapping service, various businesses are inaccurately illustrated as being towards the center of their respective buildings or at an edge of a street. Specifically, a first business is shown as located 12 in a center of a building 14 representing by a polygon, while the actual location 16 (in phantom, as it is not actually identified on the prior art map) of the business is elsewhere. As a result, and as illustrated in the example illustration 20 of prior art FIG. 1B, directions 24 from a location of a user 22 to the location 12 of the business in the building 14 are incorrect when compared to the actual location 16 (in phantom, as it is not actually identified on the prior art map) of the business in the building 104. Furthermore, and as illustrated in the example illustration 30 of prior art FIG. 1C, it cannot be determined at which business a user 32 that is identified with certain coordinates as being within the building 14 is located, even though the user is in the actual location 16 (in phantom, as it is not actually identified on the prior art map) of the business.

SUMMARY

The disclosed system provides a process for accurately determining the location, edges, and physical positions of a physical object in a multi-dimensional space, such as the location, storefront, and entrance(s) of a business in building for a mapping service. The accurate data generated by the system can be used to provide more accurate street maps, directions, and current locations of individuals using a mapping service.

According to certain aspects of the present disclosure, a computer-implemented method for improving data accuracy in a positioning system database is provided. The method includes obtaining a first two dimensional image providing a first person perspective, along a first heading from a first position at a first latitude and longitude pairing on a map, of a building including a business, and receiving from a user a first identifier in the first two dimensional image of a first edge of the business relative to the building, the first identifier associated with a first axis directed based on the first heading in the direction of the first edge of the business and passing through the first position on the map. The method also includes receiving from the user a second identifier in the first two dimensional image of a second edge of the business relative to the building, the second identifier associated with a second axis directed based on the first heading in the direction of the second edge of the business and passing through the first position on the map, and receiving from the user a third identifier in the first two dimensional image of an entrance to the business relative to the building, the third identifier associated with a third axis directed based on the first heading in the direction of the entrance of the business and passing through the first position on the map. The method further includes identifying a first point on the first axis and using the first point to identify the first edge of the business in the building on the map, identifying a second point on the second axis and using the second point to identify the second edge of the business in the building on the map, and identifying a third point on the third axis and using the third point to identify the entrance of the business in the building on the map.

In certain aspects of the method, the first point includes an intersection on the map between the first axis and a first edge of a polygon representing the building on the map, the second point includes an intersection on the map between the second axis and the second edge of the polygon representing the building, and the third point includes an intersection on the map between the third axis and the third edge of the polygon representing the building, and the first, second, and third edges are the same edge or are different edges of the polygon representing the building. In these aspects, the first point, the second point, and the third point can be identified by the user viewing the map. In these aspects, the first point, the second point, and the third point can be identified by a processor identifying each of intersection on the map between the first axis and the first edge of the polygon, the intersection on the map between the second axis and the second edge of the polygon, and the intersection on the map between the third axis and the third edge of the polygon representing the building.

In certain aspects of the method, the method further includes obtaining a second two dimensional image providing a first person perspective, along a second heading from a second position at a second latitude and longitude pairing on a map, of the building includes the business, receiving from the user a fourth identifier in the second two dimensional image of the first edge of the business relative to the building, the fourth identifier associated with a fourth axis directed based on the second heading in the direction of the first edge of the business and passing through the second position on the map, receiving from the user a fifth identifier in the second two dimensional image of the second edge of the business relative to the building, the fifth identifier associated with a fifth axis directed based on the second heading in the direction of the second edge of the business and passing through the second position on the map, and receiving from the user a sixth identifier in the second two dimensional image of the entrance to the business relative to the building, the sixth identifier associated with a sixth axis directed based on the second heading in the direction of the entrance of the business and passing through the second position on the map. In these aspects, the first point is identified as the intersection on the map of the first axis and the fourth axis, the second point is identified as the intersection on the map of the second axis and the fifth axis, and the third point is identified as the intersection on the map of the third axis and the sixth axis.

In certain aspects of the method, the method further includes providing the map for display to the user or another user, the map includes an identification on a polygon on a map representing the building of each of the first edge of the business, the second edge of the business, and the entrance of the business. In certain aspects of the method, the method further includes receiving a request from another user for directions between an origin point on the map and the business, and providing directions between the origin point and a third latitude and longitude pairing on the map associated with the entrance to the business. In certain aspects of the method, the method includes determining a set of boundaries for the business within the polygon representing the building based on the first edge of the business and the second edge of the business, receiving a location of another user, and determining based on the boundaries for the business that the another user is located at the business. In certain aspects of the method, the method further includes receiving an initial first two dimensional image providing a first person perspective along an initial heading from the first position at the first latitude and longitude pairing on the map, and receiving a request from the user to change a display of the first two dimensional image from the initial heading from the first position to the first heading from the first position. In these aspects, the first two dimensional image providing the first person perspective, along the first heading from the first position at the first latitude and longitude pairing on the map, of the building is provided in response to the request from the user to change from the initial heading from the first position to the first heading from the first position.

In certain aspects of the method, the first identifier of the first edge of the business is received at a first off-center location on the first two dimensional image, the second identifier of the second edge of the business is received at a second off-center location on the first two dimensional image, the third identifier of the entrance of the business is received at a third off-center location on the first two dimensional image, and the method further includes determining, based on a zoom level of the first two dimensional image and a pixel distance of the first identifier from the horizontal center of the first two dimensional image, a first approximate number of degrees of rotational arc difference for the first identifier from the first heading, determining, based on the zoom level of the first two dimensional image and a pixel distance of the second identifier from the horizontal center of the first two dimensional image, a second approximate number of degrees of rotational arc difference for the second identifier from the first heading, determining, based on the zoom level of the first two dimensional image and a pixel distance of the third identifier from the horizontal center of the first two dimensional image, a third approximate number of degrees of rotational arc difference for the third identifier from the first heading, generating a first modified first heading that differs from the first heading based on the determined first approximate number of degrees of rotational arc difference from the first heading, generating a second modified first heading that differs from the first heading based on the determined second approximate number of degrees of rotational arc difference from the first heading, and generating a third modified first heading that differs from the first heading based on the determined third approximate number of degrees of rotational arc difference from the first heading. In these aspects, the first axis is directed along the first modified first heading, the second axis is directed along the second modified first heading, and the third axis is directed along the third modified first heading.

In certain aspects of the method, the method further includes providing for display a marker at the horizontal center of the first two dimensional image, receiving a first request from the user to change a display of the first two dimensional image from the first heading from the first position to a first modified first heading from the first position, receiving from the user the first identifier along the marker in the first two dimensional image of the first edge of the business relative to the building, the first axis directed along the first modified first heading in the direction of the first edge of the business and passing through the first position on the map, receiving a second request from the user to change the display of the first two dimensional image from the first modified first heading from the first position to a second modified first heading from the first position, receiving from the user the second identifier along the marker in the first two dimensional image of the second edge of the business relative to the building, the second axis directed along the second modified first heading in the direction of the second edge of the business and passing through the first position on the map, receiving a third request from the user to change the display of the first two dimensional image from the second modified first heading from the first position to a third modified first heading from the first position, and receiving from the user the third identifier along the marker in the first two dimensional image of the entrance of the business relative to the building, the third axis directed along the third modified first heading in the direction of the entrance of the business and passing through the first position on the map.

In certain aspects of the method, the method further includes updating a display of edges of a polygon representing the building on the map based on the identified first point, the identified second point, and the identified third point used to identify the first edge, the second edge, the entrance of the business in the building on the map. In certain aspects of the method, the method further includes receiving from the user a fourth identifier in the first two dimensional image of another entrance to the business relative to the building, the fourth identifier associated with a fourth axis directed based on the first heading in the direction of the other entrance of the business and passing through the first position on the map, and identifying a fourth point on the fourth axis and using the fourth point to identify the other entrance of the business in the building on the map. In these aspects of the method, the first, second, third, and fourth edges are the same edge or are different edges of a polygon representing the building on the map.

According to certain aspects of the present disclosure, a system for improving data accuracy in a positioning system database is provided. The system includes a memory that includes instructions, and a processor. The processor is configured to execute the instructions to obtain a first two dimensional image providing a first person perspective, along a first heading from a first position at a first latitude and longitude pairing on a map, of a building including a business, and receive from a user a first identifier in the first two dimensional image of a first edge of the business relative to the building, the first identifier associated with a first axis directed based on the first heading in the direction of the first edge of the business and passing through the first position on the map. The processor is also configured to execute the instructions to receive from the user a second identifier in the first two dimensional image of a second edge of the business relative to the building, the second identifier associated with a second axis directed based on the first heading in the direction of the second edge of the business and passing through the first position on the map, receive from the user a third identifier in the first two dimensional image of an entrance to the business relative to the building, the third identifier associated with a third axis directed based on the first heading in the direction of the entrance of the business and passing through the first position on the map, and obtain a second two dimensional image providing a first person perspective, along a second heading from a second position at a second latitude and longitude pairing on a map, of the building includes the business. The processor is also configured to execute the instructions to receive from the user a fourth identifier in the second two dimensional image of the first edge of the business relative to the building, the fourth identifier associated with a fourth axis directed based on the second heading in the direction of the first edge of the business and passing through the second position on the map, receive from the user a fifth identifier in the second two dimensional image of the second edge of the business relative to the building, the fifth identifier associated with a fifth axis directed based on the second heading in the direction of the second edge of the business and passing through the second position on the map, and receive from the user a sixth identifier in the second two dimensional image of the entrance to the business relative to the building, the sixth identifier associated with the sixth axis directed based on the second heading in the direction of the entrance of the business and passing through the second position on the map. The processor is also configured to execute the instructions to identify, as the first edge of the business in the building, a first point on the first axis includes an intersection on the map between the first axis and the fourth axis, identify, as the second edge of the business in the building, a second point on the second axis includes an intersection on the map between the second axis and the fifth axis, and identify, as the entrance of the business in the building, a third point on the third axis includes an intersection on the map between the third axis and the sixth axis.

In certain aspects of the system, the first identifier of the first edge of the business is received at a first off-center location on the first two dimensional image, the second identifier of the second edge of the business is received at a second off-center location on the first two dimensional image, the third identifier of the entrance of the business is received at a third off-center location on the first two dimensional image, the fourth identifier of the first edge of the business is received at a fourth off-center location on the second two dimensional image, the fifth identifier of the second edge of the business is received at a fifth off-center location on the second two dimensional image, and the sixth identifier of the entrance of the business is received at a sixth off-center location on the second two dimensional image. In these aspects of the system, the processor is further configured to determine, based on a zoom level of the first two dimensional image and a pixel distance of the first identifier from the horizontal center of the first two dimensional image, a first approximate number of degrees of rotational arc difference for the first identifier from the first heading, and determine, based on the zoom level of the first two dimensional image and a pixel distance of the second identifier from the horizontal center of the first two dimensional image, a second approximate number of degrees of rotational arc difference for the second identifier from the first heading, determine, based on the zoom level of the first two dimensional image and a pixel distance of the third identifier from the horizontal center of the first two dimensional image, a third approximate number of degrees of rotational arc difference for the third identifier from the first heading, determine, based on a zoom level of the second two dimensional image and a pixel distance of the fourth identifier from the horizontal center of the second two dimensional image, a fourth approximate number of degrees of rotational arc difference for the fourth identifier from the second heading, determine, based on the zoom level of the second two dimensional image and a pixel distance of the fifth identifier from the horizontal center of the second two dimensional image, a fifth approximate number of degrees of rotational arc difference for the fifth identifier from the second heading, determine, based on the zoom level of the second two dimensional image and a pixel distance of the sixth identifier from the horizontal center of the second two dimensional image, a sixth approximate number of degrees of rotational arc difference for the sixth identifier from the second heading, generate a first modified first heading that differs from the first heading based on the determined first approximate number of degrees of rotational arc difference from the first heading, generate a second modified first heading that differs from the first heading based on the determined second approximate number of degrees of rotational arc difference from the first heading, generate a third modified first heading that differs from the first heading based on the determined third approximate number of degrees of rotational arc difference from the first heading, generate a first modified second heading that differs from the second heading based on the determined fourth approximate number of degrees of rotational arc difference from the second heading, generate a second modified second heading that differs from the second heading based on the determined fifth approximate number of degrees of rotational arc difference from the second heading, and generate a third modified second heading that differs from the second heading based on the determined sixth approximate number of degrees of rotational arc difference from the second heading. In these aspects of the system, the first axis is directed along the first modified first heading, the second axis is directed along the second modified first heading, the third axis is directed along the third modified first heading, the fourth axis is directed along the first modified second heading, the fifth axis is directed along the second modified second heading, and the sixth axis is directed along the third modified second heading.

In certain aspects of the system, the processor is further configured to provide the map for display to the user or another user, the map includes an identification on a polygon representing the building on the map of each of the first edge of the business, the second edge of the business, and the entrance of the business. In certain aspects of the system, the processor is further configured to receive a request from another user for directions between an origin point on the map and the business, and provide directions between the origin point and a third latitude and longitude pairing on the map associated with the entrance to the business. In certain aspects of the system, the processor is further configured to determine a set of boundaries for the business within a polygon representing the building on the map based on the first edge of the business and the second edge of the business, receive a location of another user, and determine based on the boundaries for the business that the another user is located at the business. In certain aspects of the system, the processor is further configured to receive an initial first two dimensional image providing a first person perspective along an initial heading from the first position at the first latitude and longitude pairing on the map, and receive a request from the user to change a display of the first two dimensional image from the initial heading from the first position to the first heading from the first position. In these aspects of the system, the first two dimensional image providing the first person perspective, along the first heading from the first position at the first latitude and longitude pairing on the map, of the building is provided in response to the request from the user to change from the initial heading from the first position to the first heading from the first position.

According to certain aspects of the present disclosure, a non-transitory machine-readable storage medium includes machine-readable instructions for causing a processor to execute a method for improving data accuracy in a positioning system database is provided. The method includes obtaining a first two dimensional image providing a first person perspective, along a first heading from a first position at a first latitude and longitude pairing on a map, of a building including a business, receiving from a user a first identifier, at a first off-center location in the first two dimensional image, of a first edge of the business relative to the building, and determining, based on a zoom level of the first two dimensional image and a pixel distance of the first identifier from the horizontal center of the first two dimensional image, a first approximate number of degrees of rotational arc difference for the first identifier from the first heading. The method also includes generating a first modified first heading that differs from the first heading based on the determined first approximate number of degrees of rotational arc difference from the first heading, identifying a first axis directed based on the first modified first heading and passing through the first position on the map, and receiving from the user a second identifier, at a second off-center location in the first two dimensional image, of a second edge of the business relative to the building. The method further includes determining, based on a zoom level of the first two dimensional image and a pixel distance of the second identifier from the horizontal center of the first two dimensional image, a second approximate number of degrees of rotational arc difference for the second identifier from the first heading, generating a second modified first heading that differs from the first heading based on the determined second approximate number of degrees of rotational arc difference from the first heading, identifying a second axis directed based on the second modified first heading and passing through the first position on the map. The method also includes receiving from the user a third identifier, at a third off-center location in the first two dimensional image, of an entrance to the business relative to the building, determining, based on a zoom level of the first two dimensional image and a pixel distance of the third identifier from the horizontal center of the first two dimensional image, a third approximate number of degrees of rotational arc difference for the third identifier from the first heading, and generating a third modified first heading that differs from the first heading based on the determined third approximate number of degrees of rotational arc difference from the first heading. The method further includes identifying a third axis directed based on the third modified first heading and passing through the first position on the map, obtaining a second two dimensional image providing a first person perspective, along a second heading from a second position at a second latitude and longitude pairing on a map, of the building includes the business, and receiving from the user a fourth identifier, at a fourth off-center location in the second two dimensional image, of the first edge of the business relative to the building. The method also includes determining, based on a zoom level of the second two dimensional image and a pixel distance of the fourth identifier from the horizontal center of the second two dimensional image, a fourth approximate number of degrees of rotational arc difference for the fourth identifier from the second heading, generating a first modified second heading that differs from the second heading based on the determined fourth approximate number of degrees of rotational arc difference from the second heading, and identifying a fourth axis directed based on the first modified second heading and passing through the second position on the map. The method further includes receiving from the user a fifth identifier, at a fifth off-center location in the second two dimensional image, of the second edge of the business relative to the building, determining, based on a zoom level of the second two dimensional image and a pixel distance of the fifth identifier from the horizontal center of the second two dimensional image, a fifth approximate number of degrees of rotational arc difference for the fifth identifier from the second heading, and generating a second modified second heading that differs from the second heading based on the determined fifth approximate number of degrees of rotational arc difference from the second heading. The method also includes identifying a fifth axis directed based on the second modified second heading and passing through the second position on the map, receiving from the user a sixth identifier, at a sixth off-center location in the second two dimensional image, of the entrance to the business relative to the building, and determining, based on a zoom level of the second two dimensional image and a pixel distance of the sixth identifier from the horizontal center of the second two dimensional image, a sixth approximate number of degrees of rotational arc difference for the sixth identifier from the second heading. The method further includes generating a third modified second heading that differs from the second heading based on the determined sixth approximate number of degrees of rotational arc difference from the second heading, identifying a sixth axis directed based on the third modified second heading and passing through the second position on the map, and identifying, as the first edge of the business in the building, a first point on the first axis includes an intersection on the map between the first axis and the fourth axis. The method also includes identifying, as the second edge of the business in the building, a second point on the second axis includes an intersection on the map between the second axis and the fifth axis, and identifying, as the entrance of the business in the building, a third point on the third axis includes an intersection on the map between the third axis and the sixth axis.

According to certain aspects of the present disclosure, a system for improving data accuracy in a positioning system database is provided. The system includes means for obtaining a first two dimensional image providing a first person perspective, along a first heading from a first position at a first latitude and longitude pairing on a map, of a building including a business. The system also includes means for receiving from a user a first identifier in the first two dimensional image of a first edge of the business relative to the building, the first identifier associated with a first axis directed based on the first heading in the direction of the first edge of the business and passing through the first position on the map, receiving from the user a second identifier in the first two dimensional image of a second edge of the business relative to the building, the second identifier associated with a second axis directed based on the first heading in the direction of the second edge of the business and passing through the first position on the map, and receiving from the user a third identifier in the first two dimensional image of an entrance to the business relative to the building, the third identifier associated with a third axis directed based on the first heading in the direction of the entrance of the business and passing through the first position on the map. The system further includes means for identifying a first point on the first axis and using the first point to identify the first edge of the business in the building on the map, identifying a second point on the second axis and using the second point to identify the second edge of the business in the building on the map, and identifying a third point on the third axis and using the third point to identify the entrance of the business in the building on the map.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1A:
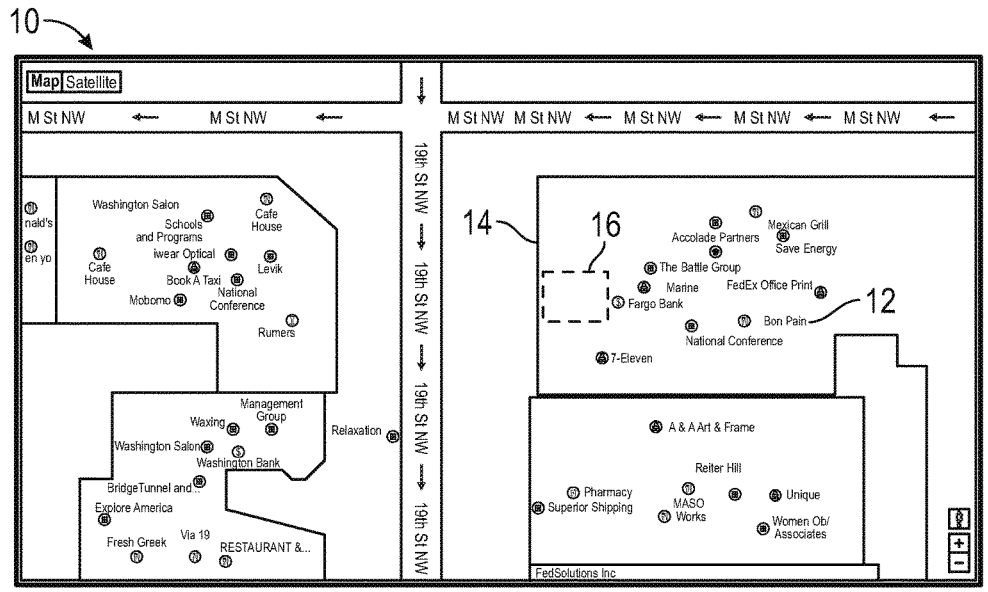
FIGS. 1A-IC provide example illustrations of prior art web mapping services.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides for more accurate positioning data for physical locations in an environment for storage in a positioning system database. The accurate positioning data can be obtained by way of an interface available on a server and accessible over a network via various client devices, the interface configured for permitting a user having access to the network to accurately identify physical aspects of physical locations using the interface, the identified physical aspects then being stored by the server in the positioning system database. The disclosed system addresses a problem of inaccurate or incomplete data stored in a positioning system database through the replacement or updating of the inaccurate or incomplete data with more accurate or more complete physical location data.

The disclosed system addresses a technical problem tied to computer technology and arising in the realm of computer networks, namely of inaccurate positional data stored in a positional database accessible over a network. The technical problem is addressed by way of a solution rooted in computer technology, namely by way of providing network access to a graphical user interface hosted on a server to a user so that the user can use the graphical user interface to obtain more accurate physical location data to be stored in a positional database to be hosted on a server. The more accurate and/or more complete physical location data stored in the positional database on the server can then be used by the same user or another user for various particular and useful applications, such as viewing more accurate map data, obtaining more accurate directions, or obtaining more accurate location information. The graphical user interface permits a user to identify, by way of a first-person perspective image or illustrated view from a position in physical space of a physical object in the physical space, physical aspects (e.g., boundaries, entrances) of the physical object and their location. The location of the identified physical aspects are then identified based on the known physical location and heading of the position of the view.

As a result, the disclosed system provides improvements to another technology and technical field, namely to the technology of positioning systems and the field of global positioning, by improving the accuracy of data used by the technology of positioning systems in the technical field of global positioning. As a result of the improvement data accuracy, users can obtain more accurate maps, directions, and location information relative to other physical objects or boundaries in an environment. In certain aspects, the disclosed system benefits from the use of specialized computing devices that include global positioning system receivers or other physical sensors that can obtain geographical location information for the respective computing devices to which they are coupled.

While many examples are provided herein in the context of store fronts for businesses located in buildings, the principles of the present disclosure contemplate the accurate location of other types of physical objects in a physical space as well. For example, any physical object viewable in an image of a physical space from a position having a location and bearing in the physical space can be more accurately located and positioned using the systems and methods disclosed herein, including, for example, signage, windows, statues or sculptures, trees, street signs such as stop signs, speed limit signs, parking meters, trash cans, bus stops, etc.

Furthermore, although the examples described herein with respect to the disclosed system are used to determine the projection of a physical location on a two-dimensional plane (e.g., latitude and longitude), the disclosed system can also be configured to determine a location in three-dimensional space and generate a three-dimension model of an object. For example, in order to obtain the height, width, and depth of a building from a position from which a photograph is taken, a user can, using the disclosed user interface displaying a building using at least two photographs taken from different positions, for example, identify the top left corner of the building. Using the latitude/longitude of the location where both images were taken and the rotation/azimuth (angle of inclination) of the camera, the system could approximate the full height of the building and generate a three-dimensional version of the building.

Figure 2A:
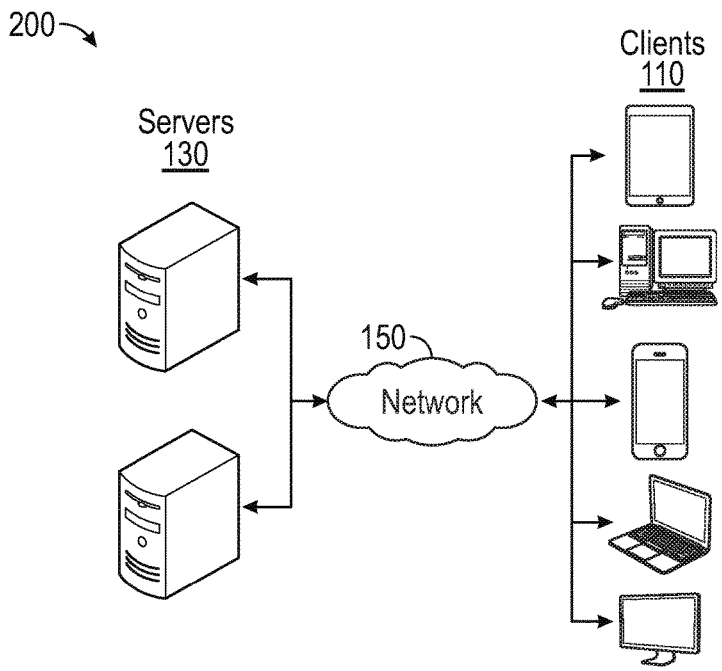
FIG. 2A illustrates an example architecture for improving data accuracy in a positioning system database by accurately determining the location, edges, and physical positions of a physical object in a multi-dimensional space.

Turning to the drawings, FIG. 2A illustrates an example architecture 200 for improving data accuracy in a positioning system database by accurately determining the location, edges, and physical positions of a physical object in a multi-dimensional space. The architecture 200 includes servers 130 and clients 110 connected over a network 150.

One of the many servers 130 is configured to host a location application and a mapping database. For purposes of load balancing, multiple servers 130 can host the location application and/or mapping database. The servers 130 can be any device having an appropriate processor, memory, and communications capability for hosting data encoder service. The location application provides a graphical user interface accessible over the network 150 for a user of one of the clients 110 to provide information that will assist with accurately determining the location of a business. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

The information provided by the user on the client 110 using the user interface of the location application facilitates the location application with identifying the latitude and longitude of a left and right side of a storefront of the business, where the entrances (e.g., doors) of the business are located, and where on a map (e.g., a building outline on a map) the business is located. The location information provided by the user is then stored in the mapping database on a server 130.

Figure 2B:
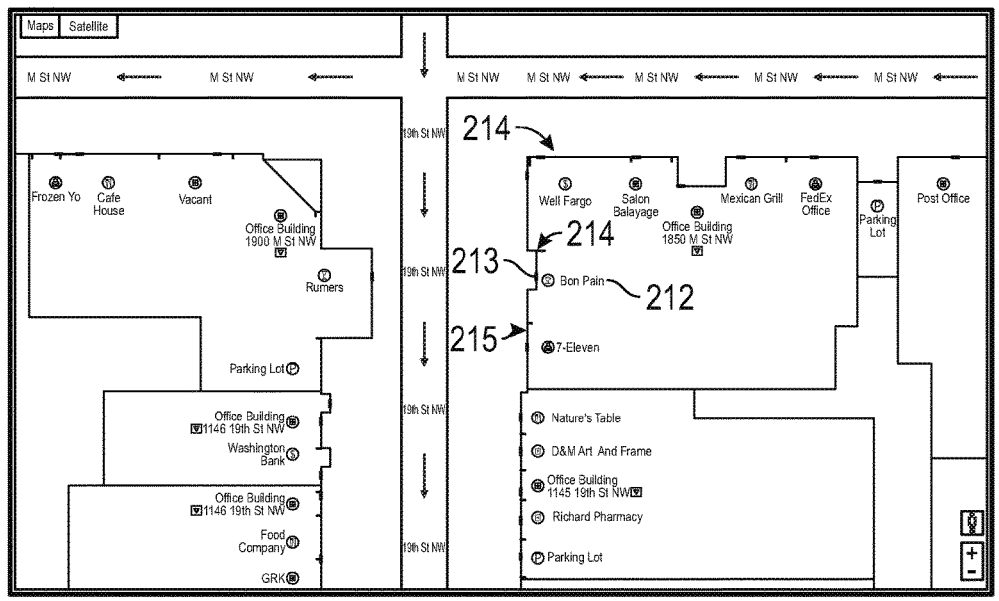
FIGS. 2B-2D provide example illustrations of maps that accurately identify the locations of businesses with respect to buildings as provided by the disclosed system.

The updated location information can assist with rendering more accurate maps, as provided in the example map 210 of FIG. 2B. Specifically, in FIG. 2B, the business 212 is displayed in its accurate physical location with respect to the building 214 as compared to the inaccurate display of the same business 12 shown in the example map 10 of prior art FIG. 1A. Furthermore, the boundaries of the storefront of the business 212 with respect to the building 214 are identified as well. The accurate physical locations of various other businesses in the building 214 are also identified in the example map 210 of FIG. 2B.

Figure 1B:
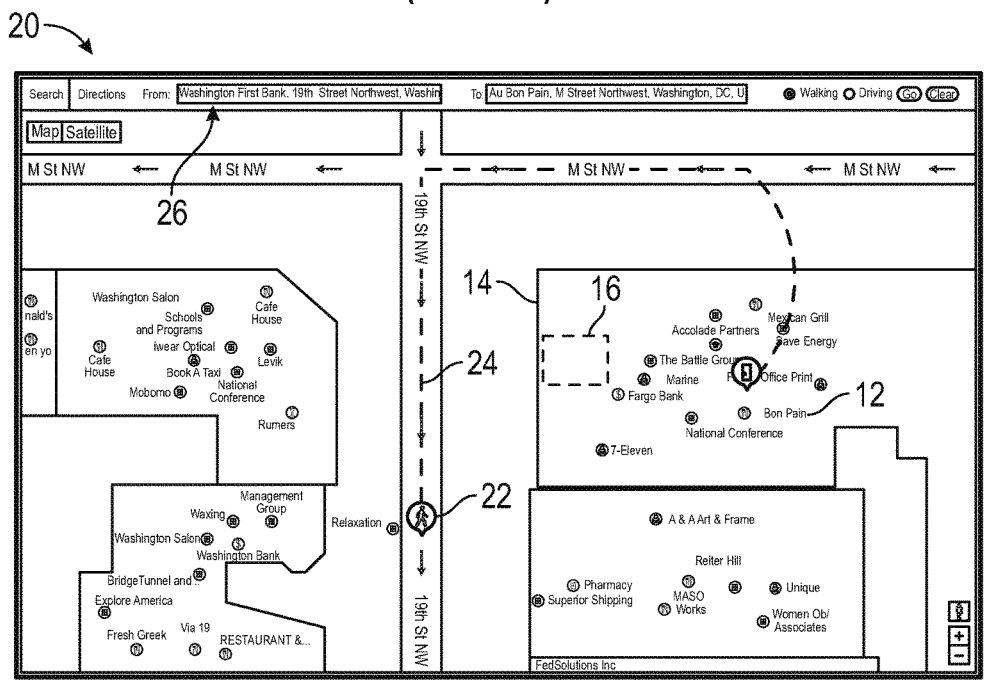
Figure 2C:
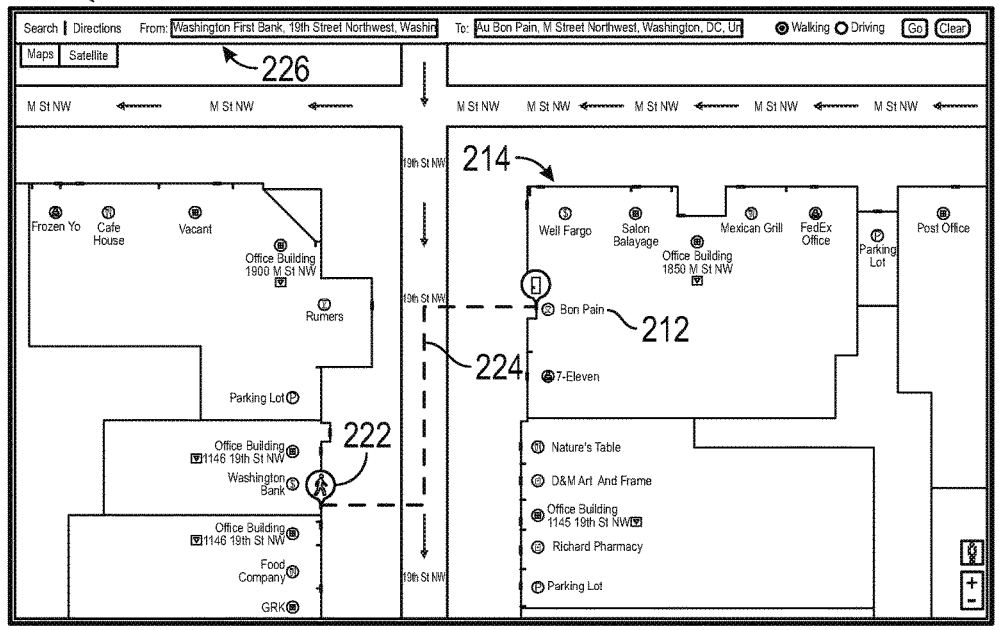

The updated location information can also assist with providing more directions to businesses, as provided in the example map 220 of FIG. 2C. Specifically, in FIG. 2C, a user is directed from a starting location 222 to the storefront of the business 212 in the building 214, which is across the street from the user's starting location 222. In existing direction systems with existing map data, the user would be directed from the starting location 222 to another street, as shown in the example map 20 of prior art FIG. 1B.

Figure 1C:
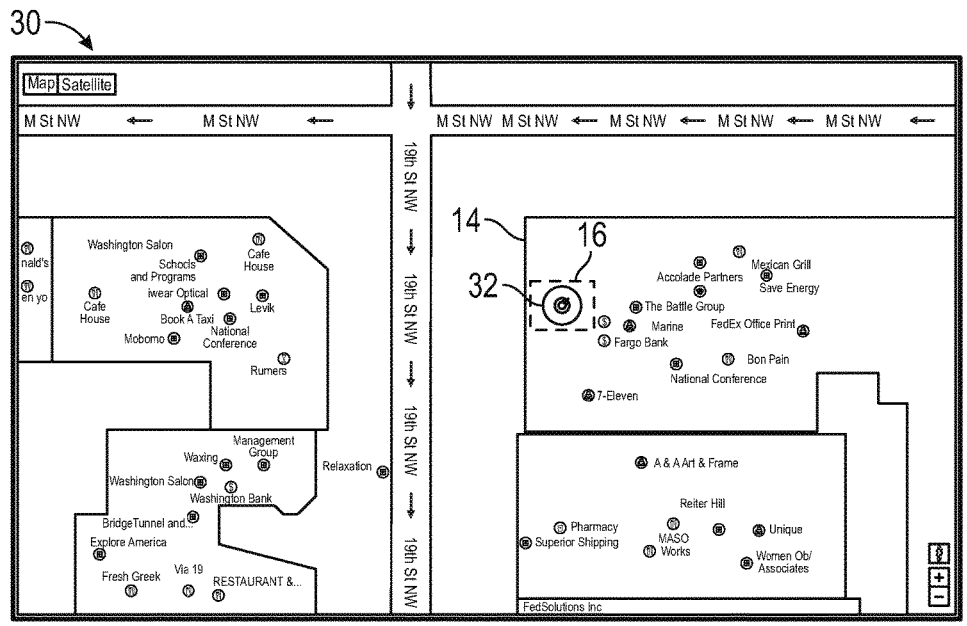
Figure 2D:
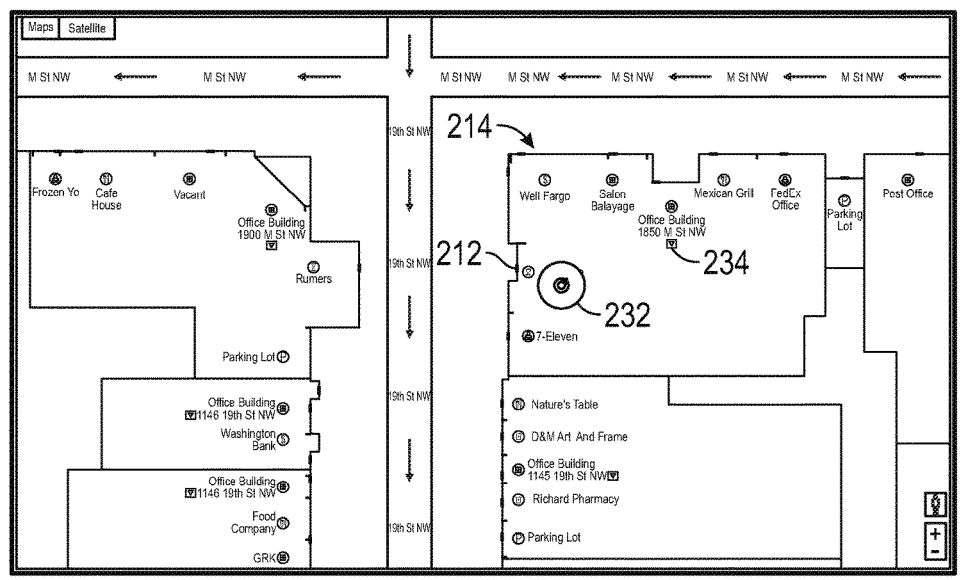

The updated location information can also assist with determining what businesses or venues a person is located at or in based on location information for the person. For example, with reference to the example map 230 of FIG. 2D, it can be determined from the location information 232 for a person that the person is located at the business 212 in the building 214. In existing mapping systems with existing map data, as shown in the example map 30 of prior art FIG. 1C, the person may be identified as being in the building 14 based on the person's location information 32, but could not be identified as being at any particular business. Also included in the example map 230 of FIG. 2D is an option menu 234 to find out more information about the business 212 at which the person is located.

The updated location information can be of particular use to various other industries, such as location based advertising, computer vision, machine learning, and data analyses. For example, with updated location information, an entity can run a computer vision process to systematically look at all storefronts using the accurate latitude, longitude, and heading information to orient a camera view in an attempt to identify businesses from signs above their entrances. As another example, with updated location information that includes known venue names as tagged by a user, an entity could use a supervised machine learning algorithm with the tagged venues as the training data to find an automated way to ascertain the venues for which the identified entrances are associated. As yet a further example, a mobile device can use GPS or other location data from the device to identify, with a high degree of accuracy, every location the mobile device travels to according to the updated location information provided by the disclosed system in order to build a profile of user behavior for targeted location-based advertising to the user associated with the mobile device.

Various approaches to permitting a user to identify the latitude and longitude of a left and right side of a storefront of the business, where the entrances (e.g., doors) of the business are located, and where on a map (e.g., a building outline on a map) the business is located using the graphical user interface of the location application (e.g., in a web browser on a client 110) are disclosed herein. The graphical user interface is a tool that places a user virtually on a street and navigates by way of photographs of the street to a photograph of a front of a building. The user then selects (e.g., using an input device of a client 110) on physical features (e.g., boundaries, entrances) of the building in the photograph. By knowing the latitude and longitude of the point from which the photograph was taken and using one of various approaches disclosed herein, the disclosed system is able to determine the location of a physical feature of the building on a map.

For example, in a first approach to permitting a user to identify the latitude and longitude of a left and right side of a storefront and entrance of a business, two two-dimensional images (e.g., photographs) of a street-level view of a building are used. A user viewing each photograph of the building using the location application identifies the same physical features of the building in both of the images. Taking into account the position (e.g., latitude and longitude) from which each photograph was taken and the heading (e.g., direction) of the photograph, a virtual axis is cast out from the position of the origin of the photograph for each identified physical feature in each photograph, and the point at which the two axes intersect for each physical feature for the two photographs is determined to be the actual location (e.g., latitude and longitude) of the physical feature.

As another example, in a second approach to permitting a user to identify the latitude and longitude of a left and right side of a storefront and entrance of a business, one two-dimensional image (e.g., photograph) of a street-view of a building is used. The user viewing the photograph of the building using the location application identifies physical features of the building in the images. Taking into account the position (e.g., latitude and longitude) from which the photograph was taken and the heading (e.g., direction) of the photograph, a virtual axis is cast out from the position of the origin of the photograph for each identified physical feature in the photograph, and the point at which each axis for each physical feature intersects a polygon representative of the building on the map as identified by the location application is determined to be the actual location (e.g., latitude and longitude) of the physical feature.

As yet another example, in a third approach to permitting a user to identify the latitude and longitude of a left and right side of a storefront and entrance of a business, one two-dimensional image (e.g., photograph) of a street-view of a building is used. The user viewing the photograph of the building using the location application identifies physical features of the building in the images. Taking into account the position (e.g., latitude and longitude) from which the photograph was taken and the heading (e.g., direction) of the photograph, a virtual axis is cast out from the position of the origin of the photograph for each identified physical feature in the photograph, and a map is displayed to the user illustrating the point at which each axis for each physical feature intersects a polygon representative of the building on the map. The user then identifies the intersection point, and the location (e.g., latitude and longitude) associated with the intersection point is determined to be the actual location of the physical feature.

Figure 3:
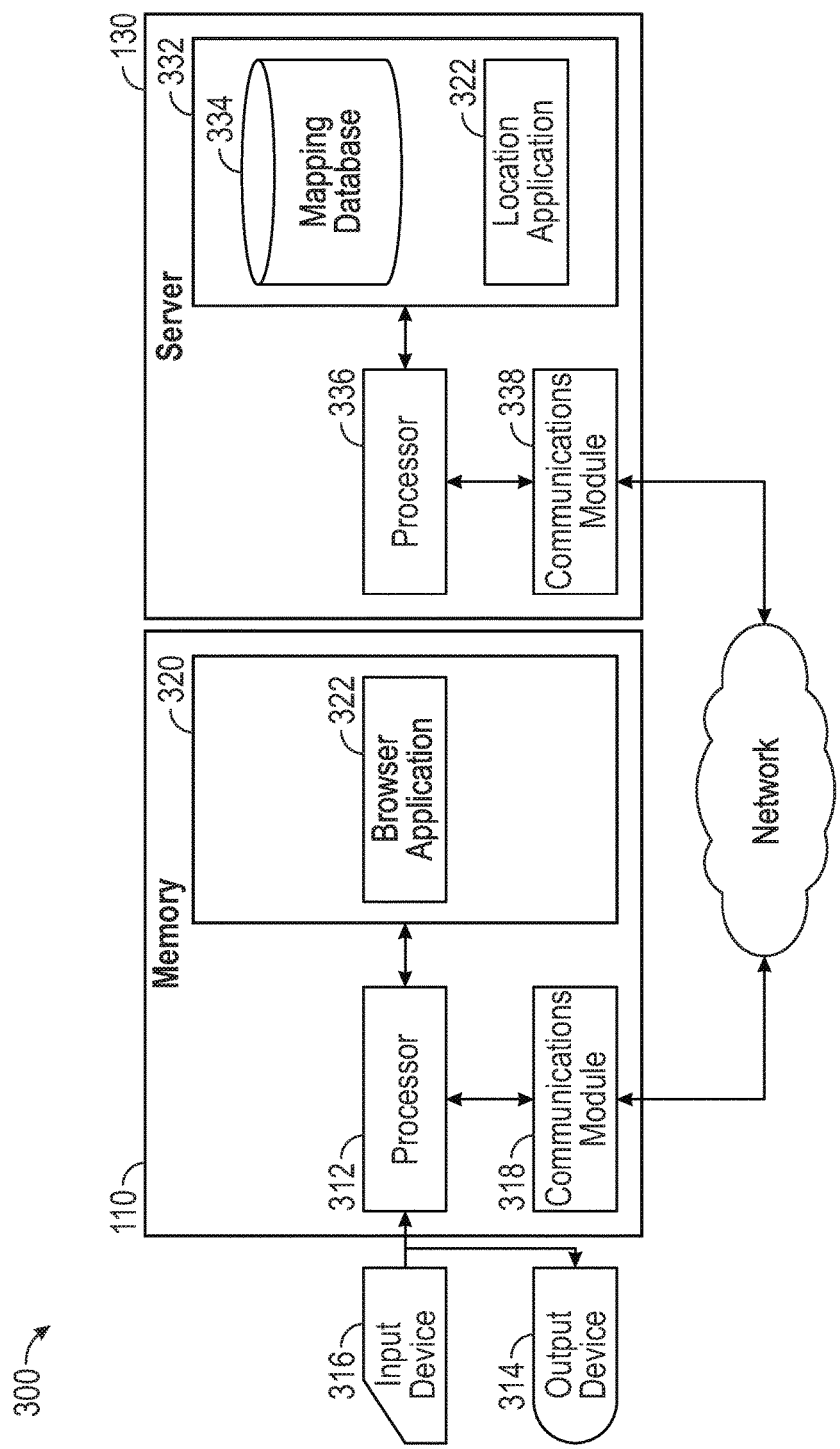
FIG. 3 is a block diagram illustrating an example client and server from the architecture of FIG. 2A according to certain aspects of the disclosure.

FIG. 3 is a block diagram 300 illustrating an example client 110 and server 130 from the architecture 200 of FIG. 2A according to certain aspects of the disclosure that are configurable to implement the systems and methods disclosed herein. The client 110 and the server 130 are connected over the network 150 via respective communications modules 318 and 338. The communications modules 318 and 338 are configured to interface with the network 150 to send and receive information, such as data, requests, responses, and commands to other devices on the network 150. The communications modules 318 and 338 can be, for example, modems or Ethernet cards.

The server 130 includes a processor 336, a communications module 338, and a memory 332 that includes a mapping database 334 and a location application 322.

The mapping database 334 can include geographical maps, including street maps and business locations. The mapping database 334 can also include two dimensional images (e.g., street-level images) providing first person perspectives of businesses along the streets. Each two dimensional image can be associated with orientations (e.g., headings that are north, south, east, west, or any combination thereof) of the camera with which the image was taken, as well latitude and longitude pairings. The mapping database can also include polygon information for buildings represented in the maps. In certain aspects, the polygon information includes latitude and longitude for all vertices of a given building used to form an outline of the building to be displayed on a map based on the vertices. One or multiple edges of a polygon can represent a storefront of a business. For example, a portion of a single edge of a polygon can represent a storefront of a business when the side of a building associated with the business is represented by a single line on the map. As another example, multiple edges of a polygon can represent a storefront of a business when the side of a building associated with the business is represented by a multiple lines on the map (e.g., the storefront is not a flat shape). Other services can provide at least some of the information in the mapping database 334, including services that provide street level imagery such as GOOGLE STREET VIEW, BING STREETSIDE, HERE/YAHOO MAPS, services that provide maps (e.g., overhead views of roads with their names, polygons for buildings, addresses, points of interest, etc.) such as GOOGLE MAPS, BING MAPS, YAHOO MAPS, OPEN STREET MAP, MAPQUEST, and building polygon data provided by cities as made available for zoning purposes.

The processor 336 of the server 130 is configured to execute instructions, such as instructions physically coded into the processor 336, instructions received from software in memory 332, or a combination of both. For example, the processor 336 of the server 130 executes instructions from the location application 322 to obtain a first two dimensional image providing a first person perspective, along a first heading from a first position at a first latitude and longitude pairing on a map, of a building that includes a business.

The first two dimensional image may not be the initial image shown to a user of the building, but instead may be displayed in response to an adjustment (e.g., rotational change and/or zoom adjustment) by the user of an initial first two dimensional image. In these aspects, the processor 336 of the server 130 is configured to receive an initial first two dimensional image (e.g., from the mapping database 334 or from a tool that provides images from a street level) providing a first person perspective along an initial heading from the first position at the first latitude and longitude pairing on the map, and receive a request from the user to change a display of the first two dimensional image from the initial heading from the first position to the first heading from the first position. Thus, the first two dimensional image providing the first person perspective, along the first heading from the first position at the first latitude and longitude pairing on the map, of the building is provided in response to the request from the user to change from the initial heading from the first position to the first heading from the first position.

The processor 336 of the server 130 is configured to receive from a user an identifier in the first two dimensional image of a first edge of the business relative to the building (hereinafter "first identifier"). The first two dimensional image can be displayed by an output device 314 displaying a browser application 322 that is stored in a memory 320 of a client 110 (e.g., a desktop computer of the user) and executed by a processor 312. The first identifier of the first edge of the business relative to the building as displayed in the first two dimensional image can be identified by the user using an input device 316 of the client 110, and information indicative of the first identifier can be transmitted by a communications module 318 over the network 150 to a communications module 338 of the server 130. The first identifier of the first edge of the business relative to the building is associated with a first axis (hereinafter "first axis") directed based on the first heading in the direction of the first edge and passing through the first position on the map.

The processor 336 of the server 130 is further configured to receive from the user an identifier in the first two dimensional image of a second edge of the business relative to the building (hereinafter "second identifier"), and an identifier in the first two dimensional image of an entrance to the business relative to the building (hereinafter "third identifier"). The second identifier is associated with a second axis directed based on the first heading in the direction of the second edge and passing through the first position on the map (hereinafter "second axis"). The third identifier is associated with a third axis directed based on the first heading in the direction of the entrance and passing through the first position on the map (hereinafter "third axis").

The processor 336 of the server 130 is also configured to identify a point on the first axis used to identify the first edge of the business in the building on the map (hereinafter "first point"), identify a point on the second axis used to identify the second edge of the business in the building on the map (hereinafter "second point"), and identify a point on the third axis used to identify the entrance of the business in the building on the map (hereinafter "third point").

For example, in the second approach described above, the processor 336 of the server 130 is configured to identify the first point, the second point, and the third point as each of the intersection on the map between the first axis and a first edge of the polygon representing the building on the map, the intersection on the map between the second axis and a second edge of the polygon, and the intersection on the map between the third axis and a third edge of the polygon representing the building, respectively. As noted above, the first, second, and third edge can be the same or different edges depending on the shape of the building. In the third approach described above, the first point, the second point, and the third point are identified by the user viewing the map, for example, by the user using the input device 316 of the client to click on the intersection points as displayed on the map to the user using the output device 314 of the client 110.

In the first approach described above, where two two-dimensional images (e.g., photographs) of a street-view of a building are used, the processor 336 of the client 110 is further configured to obtain a second two dimensional image providing a first person perspective, along a second heading from a second position at a second latitude and longitude pairing on a map, of the building including the business. For example, the second two dimensional image can be another street level image obtained from the mapping database 334 of the same business, but from a different position on the street as compared to the first two dimensional image.

Further in the first approach described above, the processor 336 is also configured to receiving from the user an identifier in the second two dimensional image of the first edge of the business relative to the building (hereinafter "fourth identifier"), an identifier in the second two dimen-sional image of the second edge of the business relative to the building (hereinafter "fifth identifier"), and an identifier in the second two dimensional image of the entrance to the business relative to the building (hereinafter "sixth identifier"). The fourth identifier is associated with a fourth axis directed based on the second heading in the direction of the first edge of the business and passing through the second position on the map, the fifth identifier is associated with a fifth axis directed based on the second heading in the direction of the second edge of the business and passing through the second position on the map, and the sixth identifier is associated with the sixth axis directed based on the second heading in the direction of the entrance of the business and passing through the second position on the map. In these aspects where a second two-dimensional image is used, the first point is identified as the intersection on the map of the first axis and the fourth axis, the second point is identified as the intersection on the map of the second axis and the fifth axis, and the third point is identified as the intersection on the map of the third axis and the sixth axis.

If, based on this first approach, the first point, the second point, and the third point associated with the business at the building do not align with an existing edge of a polygon representing the building on the map, the processor 336 is configured to update a display of the edge(s) of the polygon representing the building on the map based on the identified first point, the identified second point, and the identified third point used to identify the first edge, the second edge, the entrance of the business in the building on the map.

In certain aspects where there is more than one entrance of a business to be identified, the processor 336 is configured to receive from the user an identifier in the first two dimensional image of another entrance to the business relative to the building (hereinafter "additional entrance identifier"). The additional entrance identifier is associated with a fourth axis directed based on the first heading in the direction of the other entrance and passing through the first position on the map. The processor 336 is also configured to identify a point on the fourth axis and use the fourth point to identify the other entrance of the business in the building on the map. The point identified on the fourth axis can be identified according to the first, second, or third approaches described above, namely as an intersection between two axes or an intersection between the fourth axis and a polygon edge of the building as identified by the processor 336 or by a user.

In certain aspects, the processor 336 is configured to provide the map displaying the business for display to a user. The map can be displayed by the output device 314 of the client 110 after data for the map is sent by the server 130 over the network 150 to the client. For example, and as previously illustrated with reference to the example map 210 of FIG. 2B, the map can include an identification on the polygon of the building 214 of each of the first edge 214 of the business 212, the second edge 215 of the business 212, and the entrance 213 of the business 212.

In certain aspects, the processor 336 is also configured to receive a request from another user (e.g., of one of the clients 110 of FIG. 1 over the network 150) for directions between an origin point on the map and the business, and provide directions between the origin point and a latitude and longitude pairing on the map associated with the entrance to the business. For example, and as previously illustrated with reference to the example map 220 of FIG. 2C, the map can include directions from a starting location 222 of the other user to the entrance at the storefront of the business 212 based on the latitude and longitude pairing of the entrance identified using the system disclosed herein.

In certain aspects, the processor 336 is further configured to determine a set of boundaries for the business within the polygon representing the building based on the first edge of the business and the second edge of the business, receiving a location of another user, and determine, based on the boundaries for the business, that the another user is located at the business. For example, and as previously illustrated with reference to the example map 230 of FIG. 2D, it can be determined from the location information 232 for a person that the person is located at the business 212 in the building 214.

Figure 4:
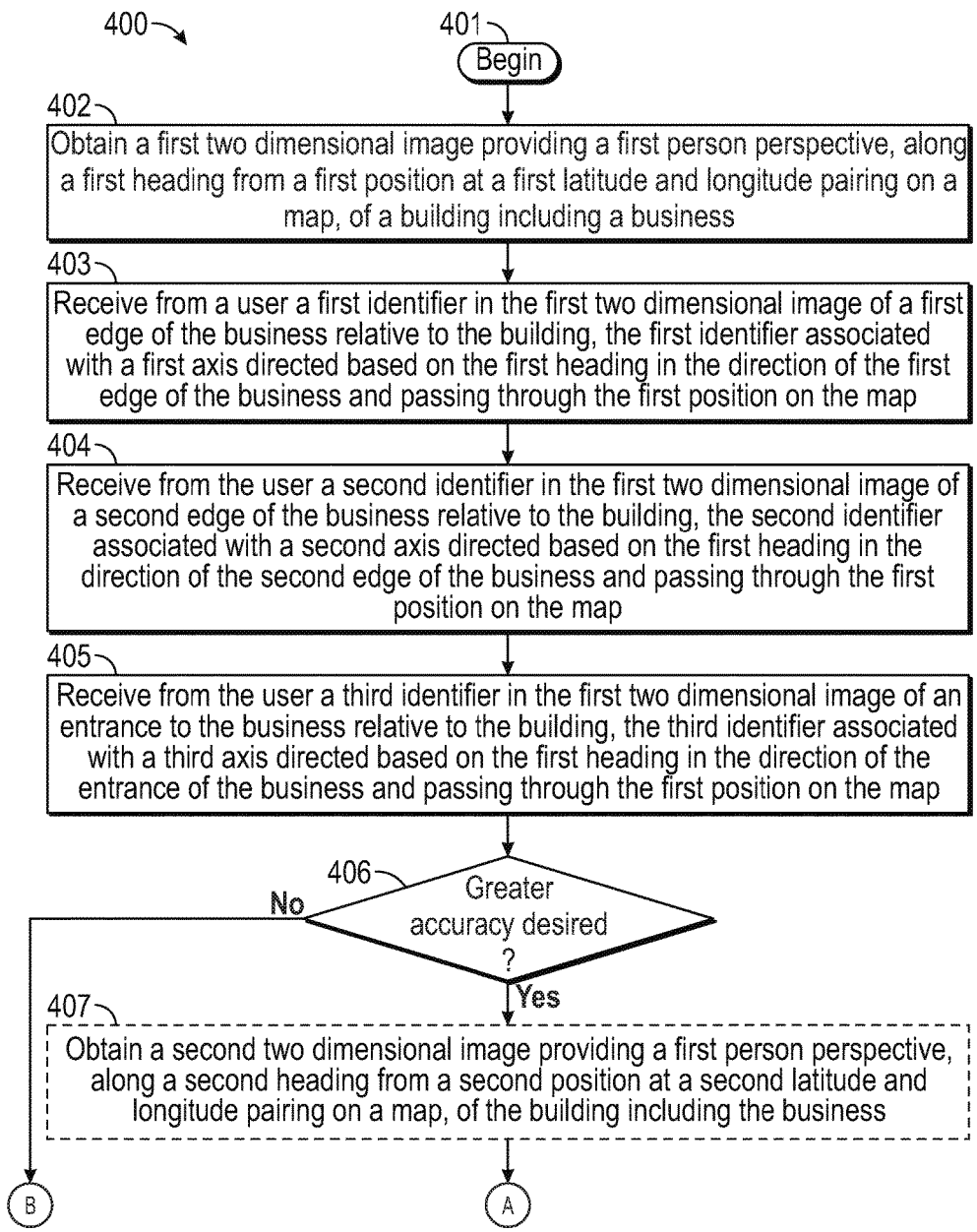
FIG. 4 illustrates an example process for improving data accuracy in a positioning system database by accurately determining the location, edges, and physical positions of a physical object in a multi-dimensional space using the example server of FIG. 2A.
Figure 4:
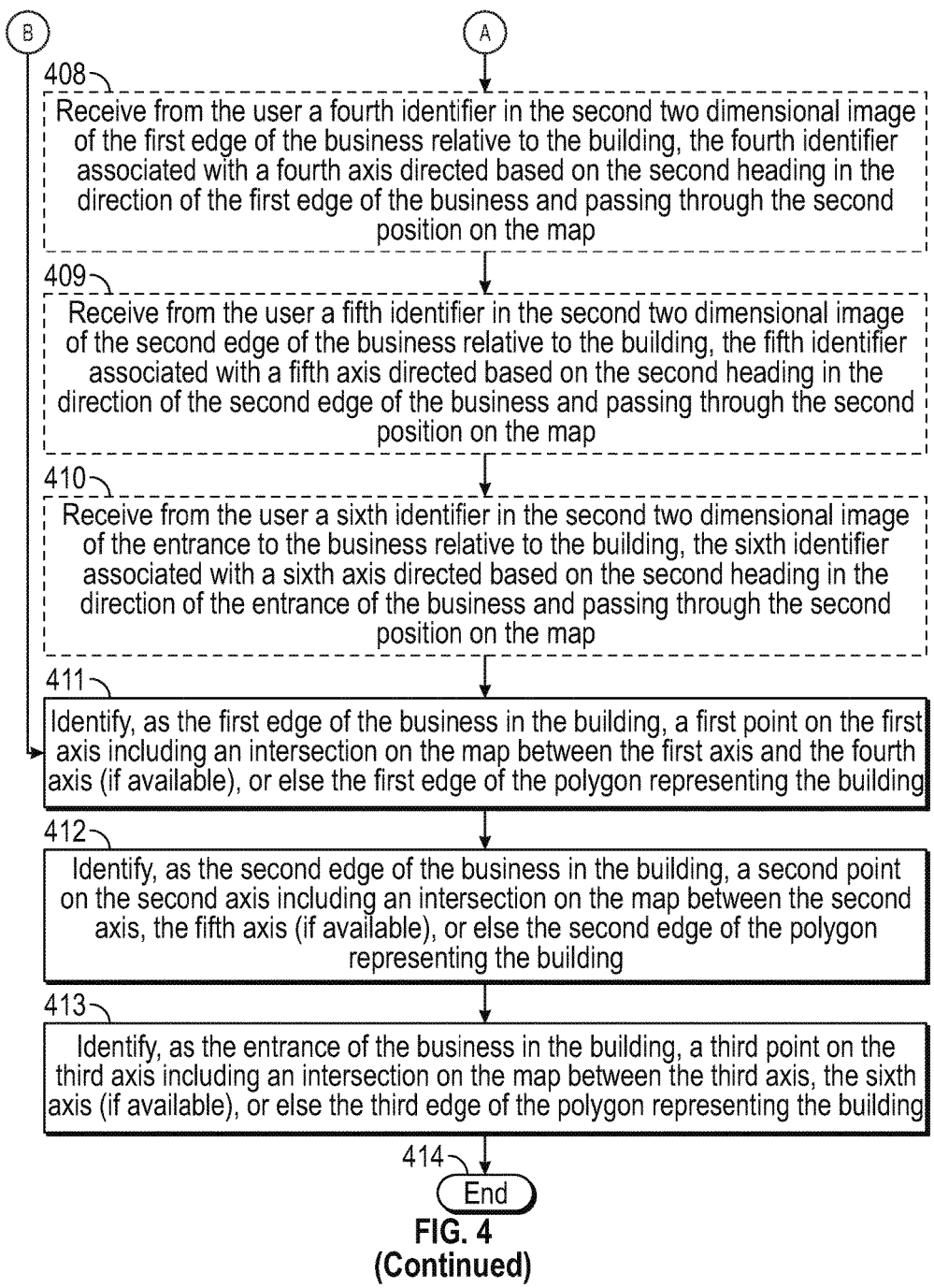

FIG. 4 illustrates an example process 400 for improving data accuracy in a positioning system database by accurately determining the location, edges, and physical positions of a physical object in a multi-dimensional space using the example server 130 of FIG. 2A. While FIG. 4 is described with reference to FIG. 2A, it should be noted that the process steps of FIG. 4 may be performed by other systems.

The process 400 begins by proceeding from beginning step 401 when a user accesses the location application 322 through a browser application 322 on a client to step 402 when the location application 322 running on the server obtains (e.g., for display on the client 110) a first two dimensional image providing a first person perspective, along a first heading from a first position at a first latitude and longitude pairing on a map, of a building including a business.

Next, in step 403, a first identifier in the first two dimensional image of a first edge of the business relative to the building is received from a user. The first identifier is associated with a first axis directed based on the first heading in the direction of the first edge of the business and passing through the first position on the map. In step 404, a second identifier in the first two dimensional image of a second edge of the business relative to the building is received from the user. The second identifier is associated with a second axis directed based on the first heading in the direction of the second edge of the business and passing through the first position on the map. In step 405, a third identifier in the first two dimensional image of an entrance to the business relative to the building is received from the user. The third identifier associated with a third axis directed based on the first heading in the direction of the entrance of the business and passing through the first position on the map.

In decision step 406, if greater accuracy is desired for the locations of the first edge, the second edge, and the entrance of the business, the process 400 proceeds to optional steps 407-410 (illustrated in phantom), which includes steps according to the first approach to permitting a user to identify the latitude and longitude of a left and right side of a storefront and entrance of a business described above. If greater accuracy is not desired for the locations of the first edge, the second edge, and the entrance of the business, the process 400 proceeds to step 411, which includes steps according to the second and third approaches described above.

In step 407, a second two dimensional image is obtained providing a first person perspective, along a second heading from a second position at a second latitude and longitude pairing on a map, of the building including the business. In step 408, a fourth identifier in the second two dimensional image of the first edge of the business relative to the building is received from the user. The fourth identifier is associated with a fourth axis directed based on the second heading in the direction of the first edge of the business and passing through the second position on the map. In step 409, a fifth identifier in the second two dimensional image of the second edge of the business relative to the building is received from the user. The fifth identifier is associated with a fifth axis directed based on the second heading in the direction of the second edge of the business and passing through the second position on the map. In step 410, a sixth identifier in the second two dimensional image of the entrance to the business relative to the building is received from the user. The sixth identifier is associated with a sixth axis directed based on the second heading in the direction of the entrance of the business and passing through the second position on the map.

In step 411, a first point on the first axis that is an intersection on the map between the first axis and the fourth axis (if available due to the process 400 performing step 408) is identified as the first edge of the business in the building, or else the first point on the first axis is identified as the intersection on the map between the first axis and a first edge of a polygon representing the building on the map. In step 412, a second point on the second axis that is an intersection on the map between the second axis and the fifth axis (if available due to the process 400 performing step 409) is identified as the second edge of the business in the building, or else the second point on the second axis is identified as the intersection on the map between the second axis and a second edge of the polygon representing the building. In step 413, a third point on the third axis that is an intersection on the map between the third axis and the sixth axis (if available due to the process 400 performing step 410) is identified as the entrance of the business in the building, or else the third point on the third axis is identified as the intersection on the map between the third axis and a third edge of the polygon representing the building. As discussed above, the first, second, and third edges of the polygon representing the building can be the same or different edges of the polygon, depending on the shape of the building. The process 400 then ends in step 414.

FIG. 4 set forth an example process 400 for improving data accuracy in a positioning system database by accurately determining the location, edges, and physical positions of a physical object in a multi-dimensional space using the example server 130 of FIG. 2A. An example will now be described using the example process 400 of FIG. 4 and the first approach described above to permitting a user to identify the latitude and longitude of a left and right side of a storefront and entrance of a business.

Figure 5A:
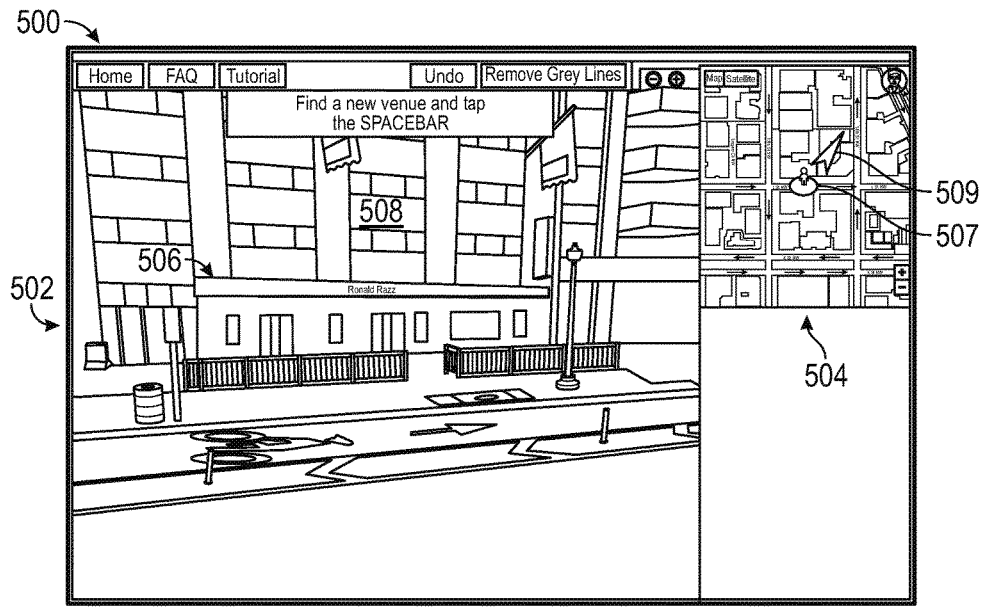
FIGS. 5A-5L are example illustrations and maps associated with the example process of FIG. 4.

The process 400 begins by proceeding from beginning step 401 when a user accesses the website for a location application 322 through a web browser application 322 on a desktop client to step 402 when the location application 322 running on the server obtains for display on the client 110 a first two dimensional image providing a first person perspective, along a first heading from a first position at a first latitude and longitude pairing on a map, of a building including a business. FIG. 5A is an example illustration 500 of a user interface for the location application 322. The user navigates in the user interface to a place (latitude −77.04256758285362 and longitude 38.90733123624135) where the user has a view of a storefront 506 of a building 508. The user rotates the user's view so the user has a good view of the storefront 506 (e.g., at a heading of 15.423376823530832°, where the heading is a value in degrees starting at 0, meaning directly due North and increasing clockwise such that directly East is 90°, directly South is 180°, directly West is 270°, ending just before 360° which would be coming back to North again), and the user presses a space bar on the keyboard input device 316 to initiate the location information providing process. The user interface also includes a street-level photograph 502 of the building 508 that includes the storefront 506 of a business, and a map view 504 of the area in which the photograph 502 was taken. The map view 504 includes an identification of the position 507 from which the photograph was taken, with an icon of a person in a direction of the heading/orientation 509 from which the photograph was taken.

Figure 5B:
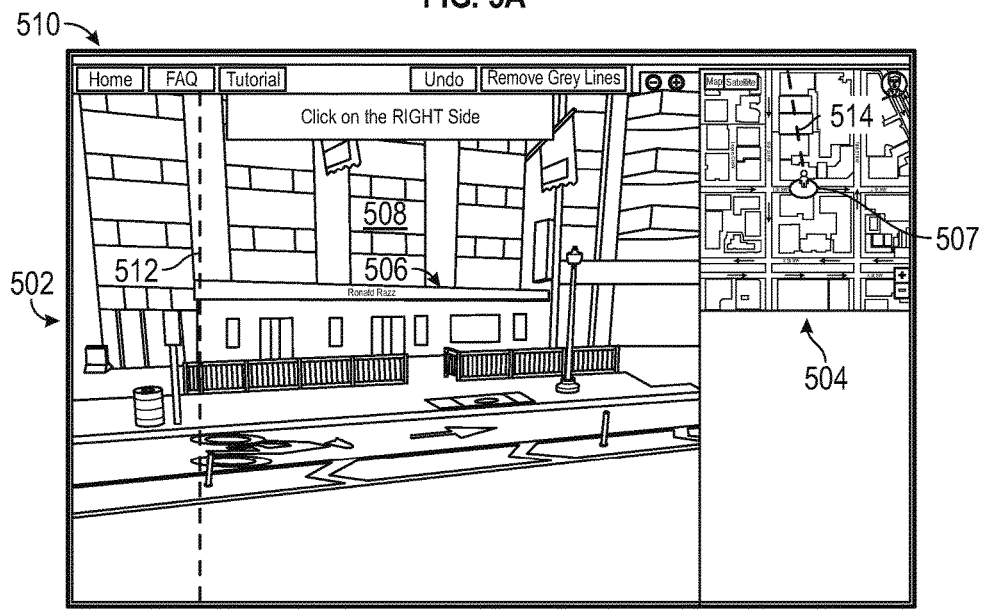

Next, in step 403, the user clicks on a left portion of the street-level photograph 502 to provide a first identifier 512 of a first edge of the storefront 506 of the business relative to the building 508 as provided in the example illustration 510 of FIG. 5B. This is done by the user finding the left side of the storefront 506 with a cursor-based (e.g., mouse) input device 316 and triggering the cursor (e.g., clicking the mouse) when found. Using a pixel estimation algorithm described in further detail below, the place in the street-level photograph 502 where the user identified the left side of the storefront 506 is translated into a heading value (e.g., in this case a click on the left side of the storefront 506 is translated into a heading of −9.191199748291794°). The first identifier 512 is displayed in the photograph 502 so that the user can see what the user has identified. The first identifier 512 is associated with a first axis 514 displayed in the map 504. The first axis 514 is directed according to the translated heading value and passes through the first position 507 on the map 504.

The user is able to adjust the user's view to view the storefront so that, for example, if the building is a large building and the view of the user is close to the large building such that the user can only view the left side of a storefront to identify the left side of the storefront, the user can rotate the user's view to see the right side of the storefront to identify the right side of the storefront. Similarly, if the view of the user is close to a large curved building such that the user can see and identify the left storefront, but rotating the user's view from the same position does not provide a view of the right side of the storefront, the user can move down the street to a place where the user has a good view of the right side of the storefront before identifying it. This ability to move or adjust the user's view is available for each of the street-level photographs of the process 400 of FIG. 4.

Figure 5C:
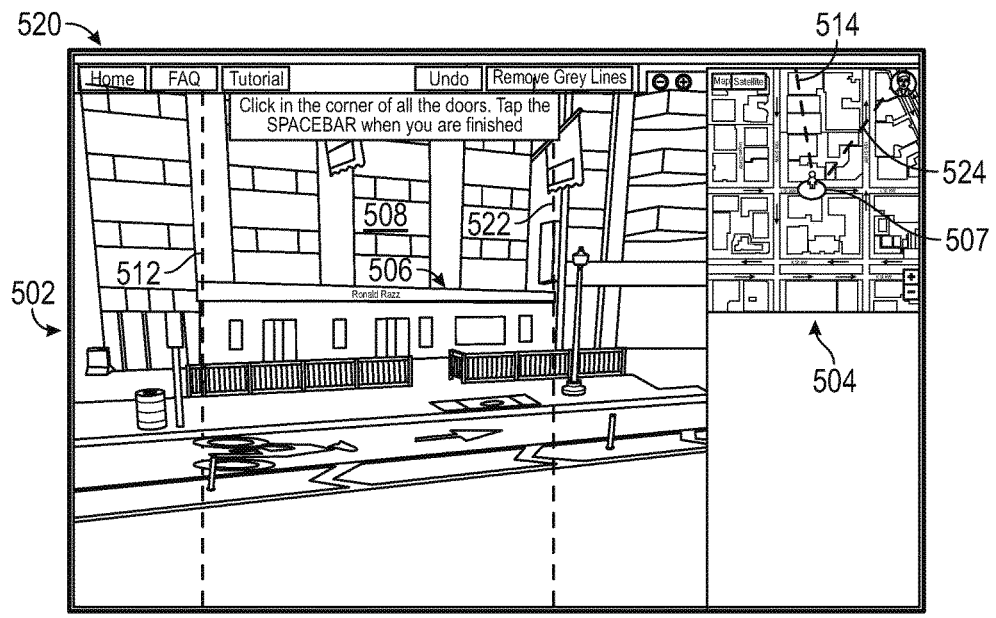

In step 404, the user clicks on a right portion of the street-level photograph 502 to provide a second identifier 522 of a second edge of the storefront 506 of the business relative to the building 508 as provided in the example illustration 520 of FIG. 5C. This is done by the user finding the right side of the storefront 506 with the cursor-based input device 316 and triggering the cursor when found. Using the pixel estimation algorithm, the place in the street-level photograph 502 where the user identified the right side of the storefront 506 is translated into a heading value (e.g., in this case a click on the right side of the storefront 506 is translated into a heading of 35.96778028258811°). The second identifier 522 is displayed in the photograph 502 so that the user can see what the user has identified. The second identifier 522 is associated with a second axis 524 displayed in the map 504. The second axis 524 is directed according to the translated heading value for the right side of the building according to the photograph 502 and passes through the first position 507 on the map 504.

Figure 5D:
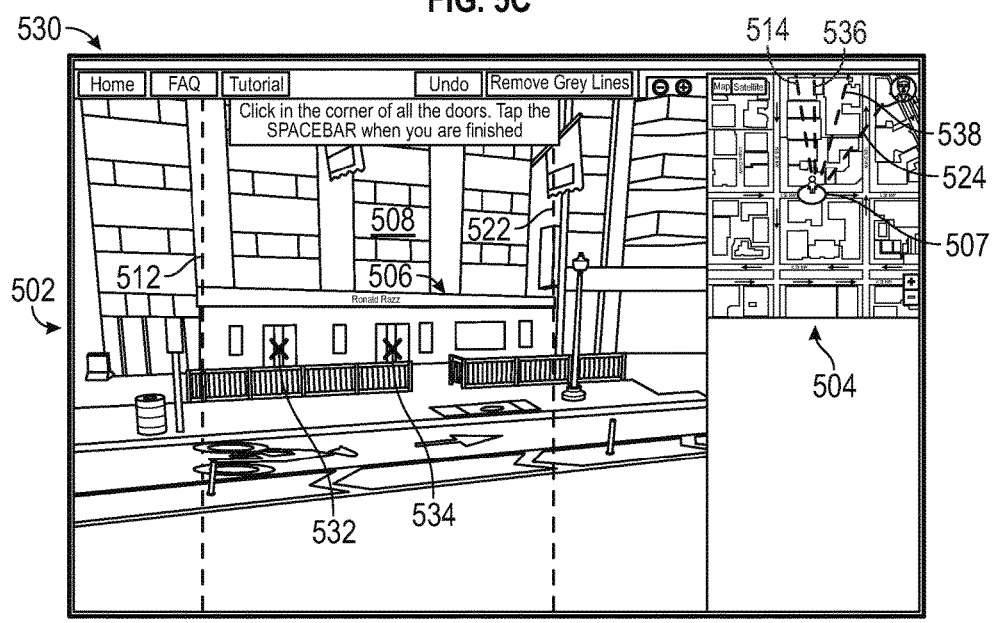

In step 405, the user clicks on two entrances in the street-level photograph 502 to provide third identifiers 532 and 534 of two entrances of the storefront 506 of the business relative to the building 508 as provided in the example illustration 530 of FIG. 5D. This is done by the user finding the two entrances to the storefront 506 with the cursor-based input device 316 and triggering the cursor when found. Using the pixel estimation algorithm, the place in the street-level photograph 502 where the user identified the entrances to the storefront 506 are translated into heading values (e.g., in this case a click on the entrances to the storefront 506 are translated into a headings of −0.8665269863944918° and 14.924679289166544°). The third identifiers 532 and 534 are displayed in the photograph 502 so that the user can see what the user has identified. The third identifiers 532 and 534 are associated with third axes 536 and 538 displayed in the map 504. The third axes are directed according to the translated heading value for the entrances according to the photograph 502 and pass through the first position 507 on the map 504.

Figure 5E:
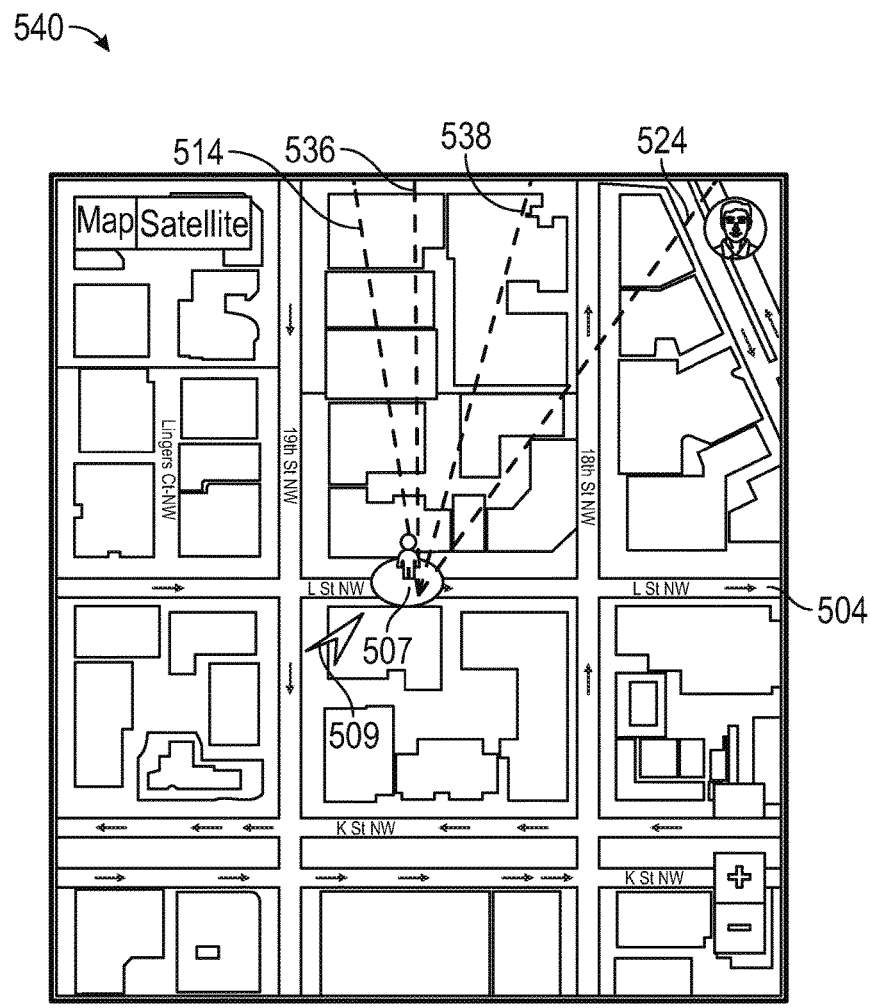

By this step in the process, the following location information is known: (a) the latitude/longitude of the camera position from which this user was viewing the building 508 (−77.04256758285362, 38.90733123624135), (b) the heading for the left edge 512 of the storefront 506 (−9.191199748291794°), (c) the heading for the right edge 522 of the storefront 506 (35.96778028258811°), and (d) the heading for the entrances 532 and 534 (−0.86652698639449180 and 14.924679289166544° respectively). As illustrated in the map 540 of FIG. 5E, axes 514, 524, 536, and 538 are provided for display from the camera position 507 and heading 509 from which the user was viewing the building 508 in the photograph 502.

In decision step 406, because the first approach to permitting a user to identify the latitude and longitude of a left and right side of a storefront and entrance of a business that uses two two-dimensional images (e.g., photographs) of a street-view of a building is being implemented by the location application 322, the process 400 proceeds to step 407.

Figure 5F:
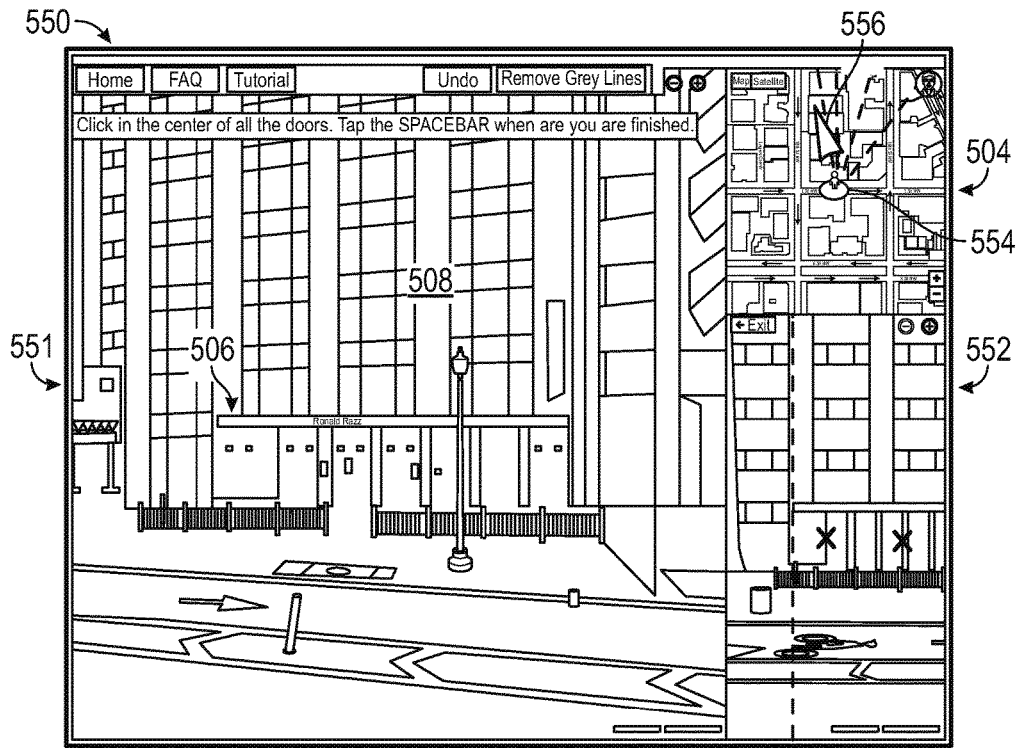

In step 407, the user presses the spacebar on the input device 316 of the client to translate the view of the user of the building 508 to a second position (e.g., to the left or to the right of the first position) and a second two dimensional image is obtained and displayed on the output device 314 of the client 110 providing a first person perspective, along a second heading from the second position at a second latitude and longitude pairing on a map, of the building 508 including the storefront 506 of the business. FIG. 5F provides an example illustration 550 of the user interface that includes a second street-level photograph 551 of the building 508 and the map view 504 of the area in which the different photograph 551 of the building was taken. Also included in the illustration 550 of the user interface is a previous view 552 of the first street-level photograph 502 with the identifiers for the edges and entrance of the storefront 506 previously provided by the user in steps 403-405. The position from which the second photograph 551 was taken is a latitude/longitude of (38.903734, −77.042592). The map view 504 includes an identification of the position 554 from which the second photograph was taken, with an icon of a person in a direction of the heading/orientation 556 from which the second photograph was taken.

Figure 5G:
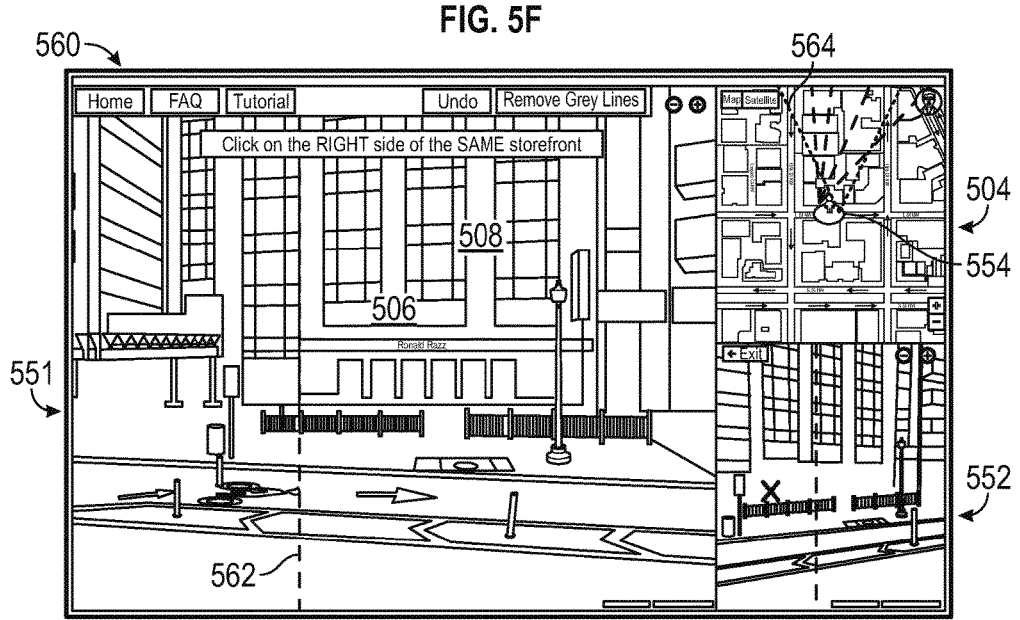

In step 408, the user clicks on a left portion of the second street-level photograph 551 to provide a fourth identifier 562 of the first edge of the storefront 506 of the business relative to the building 508 as provided in the example illustration 560 of FIG. 5G. This is done by the user finding the left side of the storefront 562 with a cursor-based input device 316 and triggering the cursor when found. Using the pixel estimation algorithm, the place in the second street-level photograph 551 where the user identified the left side of the storefront 562 is translated into a heading value (e.g., in this case a click on the left side of the storefront 562 is translated into a heading of 325.5785357894757°). The fourth identifier 562 is displayed in the second photograph 551 so that the user can see what the user has identified. The fourth identifier 562 is associated with a fourth axis 564 displayed in the map 504. The fourth axis is directed according to the translated heading value and passes through the second position 554 on the map 504.

Figure 5H:
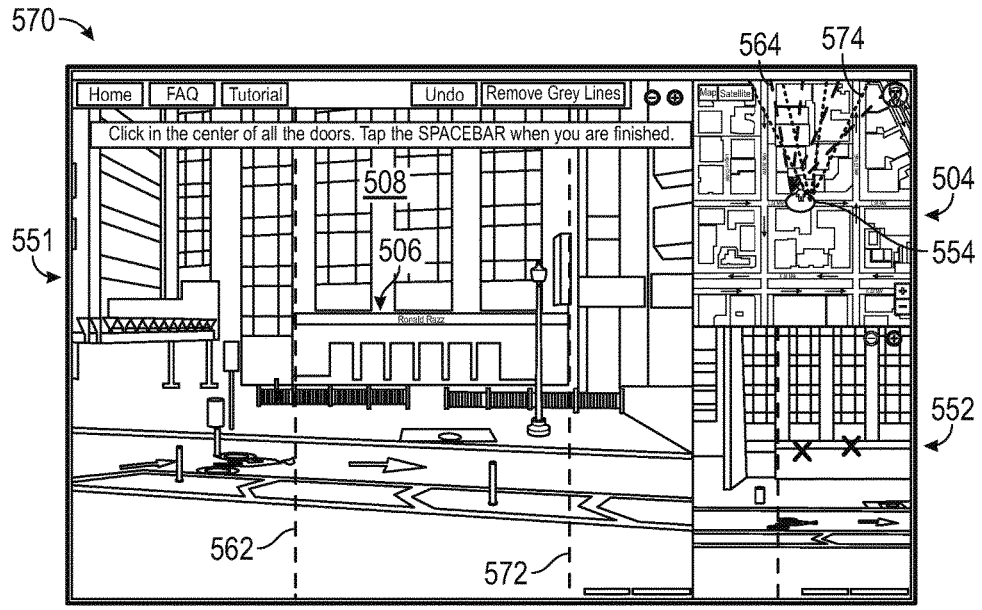

In step 409, the user clicks on the right portion of the second street-level photograph 551 to provide a fifth identifier 572 of the right edge of the storefront 506 of the business relative to the building 508 as provided in the example illustration 570 of FIG. 5H. This is done by the user finding the right side of the storefront 562 with a cursor-based input device 316 and triggering the cursor when found. Using the pixel estimation algorithm, the place in the second street-level photograph 551 where the user identified the right side of the storefront 562 is translated into a heading value (e.g., in this case a click on the right side of the storefront 572 is translated into a heading of 10.9248733961686°). The fifth identifier 572 is displayed in the second photograph 551 so that the user can see what the user has identified. The fifth identifier 572 is associated with a fifth axis 574 displayed in the map 504. The fifth axis is directed according to the translated heading value and passes through the second position 554 on the map 504.

Figure 5I:
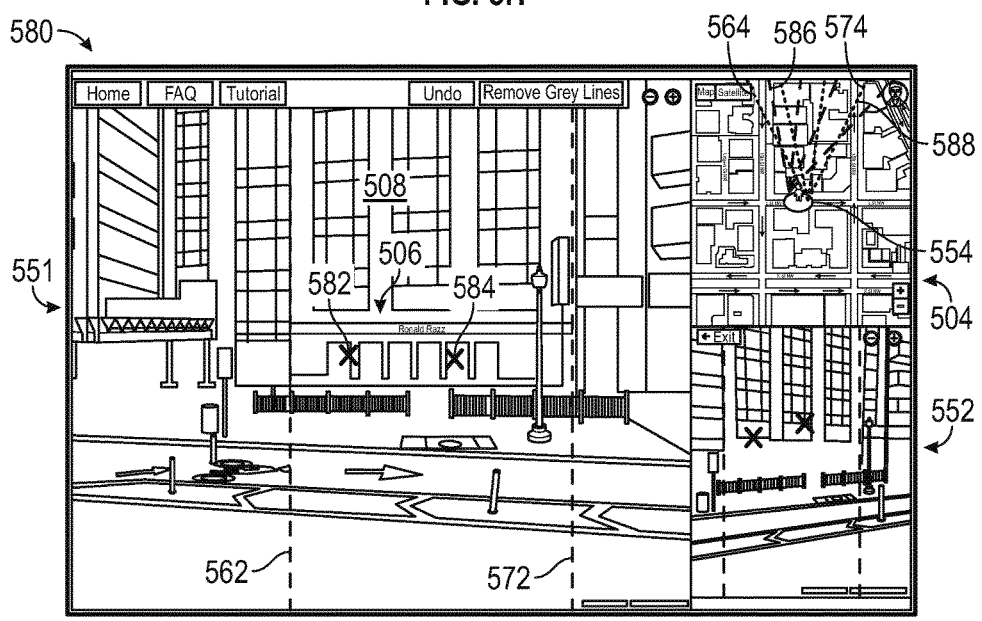

In step 410, the user clicks on the two entrances in the second street-level photograph 551 to provide sixth identifiers 582 and 584 of the two entrances of the storefront 506 of the business relative to the building 508 as provided in the example illustration 580 of FIG. 5I. This is done by the user finding the two entrances to the storefront 506 with the cursor-based input device 316 and triggering the cursor when found in the same order as the user previously identified the entrances in step 405. Using the pixel estimation algorithm, the place in the second street-level photograph 551 where the user identified the entrances to the storefront 506 are translated into heading values (e.g., in this case a click on the entrances to the storefront 506 are translated into a headings of 332.55083973984165° and 346.40111842110963°). The sixth identifiers 562 and 572 are displayed in the second photograph 551 so that the user can see what the user has identified. The third identifiers 562 and 572 are associated with sixth axes 586 and 588 displayed in the map 504. The sixth axes 586 and 588 are directed according to the translated heading value for the entrances according to the second photograph 551 and pass through the second position 554 on the map 504.

Figure 5J:
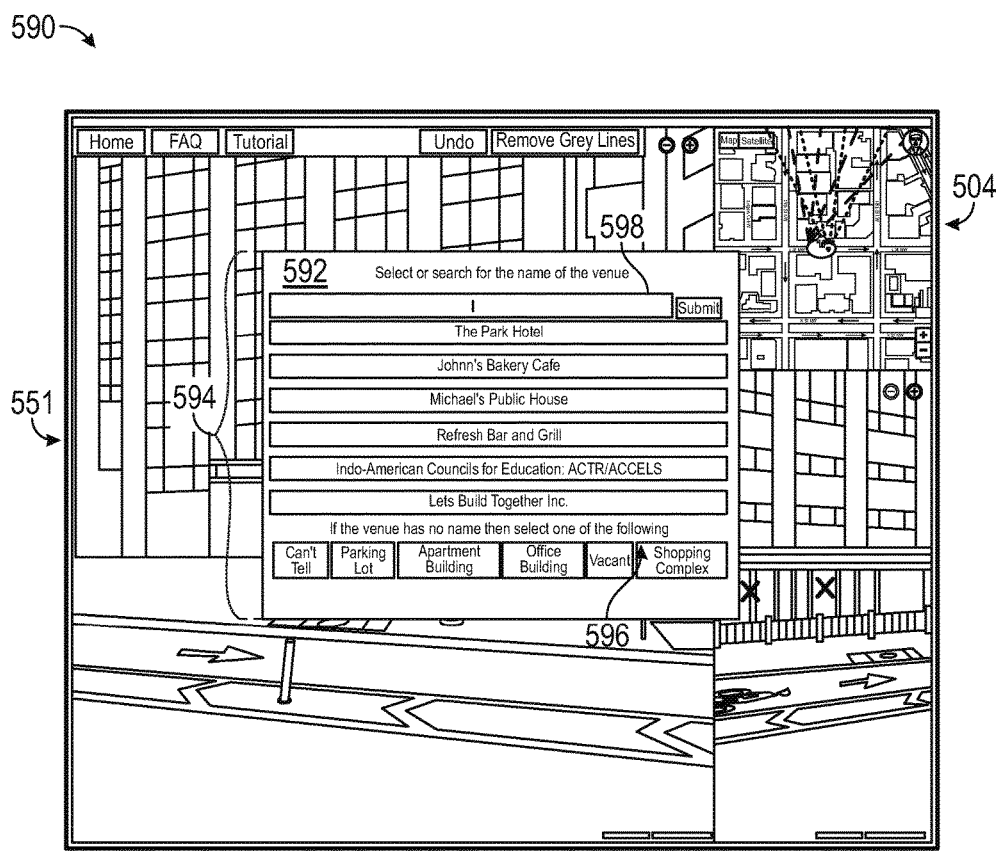

In response to identification of the two entrances in the second photograph 551 a menu 592 is provided for display to the user so that the user can identify the business the user has been providing location information for, as provided in the example illustration 590 of FIG. 5J. The menu 592 includes an input field 598 for the user to type a name for the business, a listing 594 of known businesses in the geographical area of the map 504 from which the user can select a business, and other selectable options 596 (e.g., categories, an indicator that the user is unable to identify the business, etc.) for identifying the business. At the conclusion of step 410 the location application 322 has collected the information it needs from the user in order to determine the name of the business and the latitude and longitude for the left storefront, the right storefront, and each of the entrances of the business.

Figure 5K:
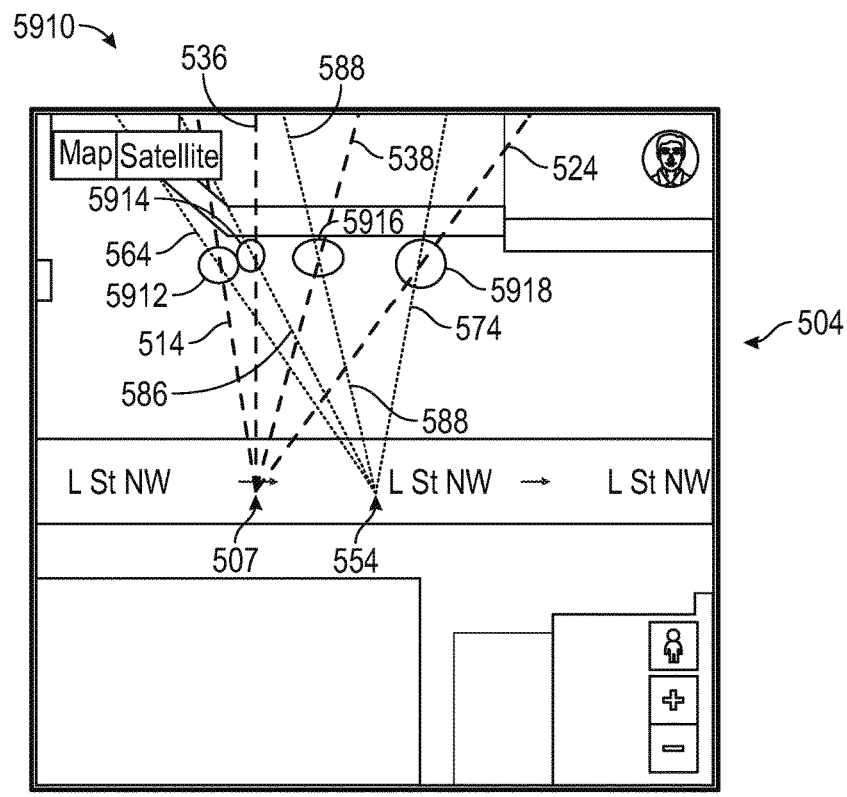
Figure 5L:
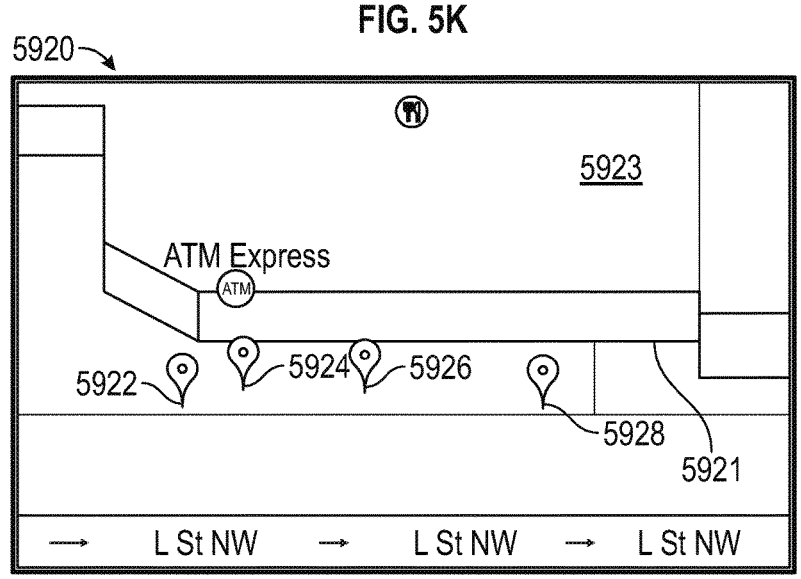

Subsequently, in step 411, and with reference to the map 5910 illustrated in FIG. 5K, the processor 336 is configured to identify, as the first point (at latitude and longitude locations of 38.90387194823941, −77.0427134752081), the intersection 5912 on the map 5910 between the first axis 514 and the fourth axis 564 for the left side of the storefront 506 of the business in the building 508. In step 412, the processor 336 is configured to identify, as the second point (at latitude and longitude locations of 38.903871230172385, −77.04255796194428), the intersection 5918 on the map 5910 between the second axis 524 and the fourth axis 574 for the right side of the storefront 506 of the business in the building 508. In step 413, the processor 336 is configured to identify, as the third points (at latitude and longitude locations of 38.90387747535516, −77.04268776914287 and 38.90387686374541, −77.0426364098751), the intersections 5914 and 5916 on the map 5910 between the third axes 536 and 538 and the sixth axes 586 and 588 for the two entrances of the storefront 506 of the business in the building 508. As provided in the example map 5920 of FIG. 5L, indicators 5922, 5928, and 5924 and 5926 for the first, second, and third points respectively show that the accurate locations for the edges and entrances of the building do not align with the edge 5921 of the polygon 5923 representing the building, and therefore the location information for the building as represented by the polygon 5923 is incorrect. The process 400 ends in step 414.

Figure 6:
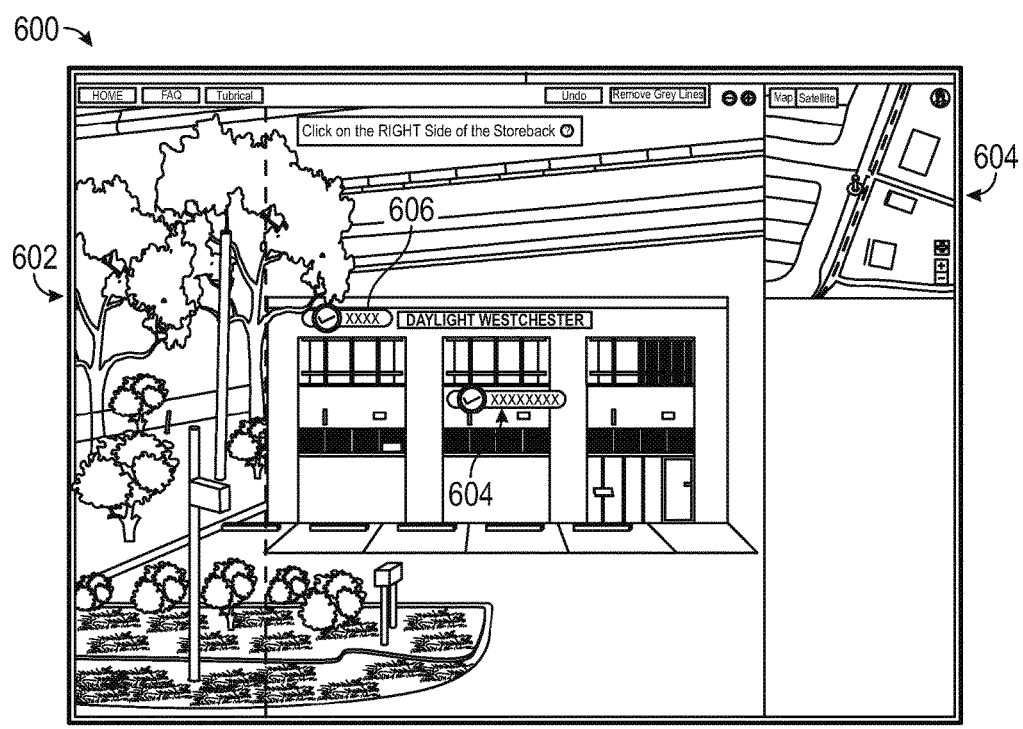
FIG. 6 in an example illustration associated with a pixel estimation algorithm as described herein.

FIG. 6 in an example illustration 600 associated with a pixel estimation algorithm as described herein. The disclosed pixel estimation algorithm assists with identifying a location of an identified object in an image based on the heading and location from which the image was taken. For example, when a user is viewing a street level photograph provided by the mapping database 334 or other tool, the latitude and longitude of the point where the camera was located when the photograph was taken along with the angle (heading) in which the center of the viewport of the photograph is facing is provided with the photograph. If the user were to identify an object that is in the exact horizontal center of the photograph, the angle of rotation provided would match the angle at which the user identified the object in the photograph and the location of the object could be identified accordingly.

In certain aspects, the location application 322 is configured to limit the user to identifying physical objects (e.g., edges and entrances of storefronts) when those physical objects are in the horizontal center of the two dimensional image provided for display to the user in the location application 322 for the identification of edges and entrances of a business. In these aspects, the processor 336 of the server 130 is configured to provide for display a marker at the horizontal center of a two dimensional image (e.g., a street-level view of a building), and receive a first request from the user to change a display of the two dimensional image from the first heading from the first position to a first modified first heading from the first position. This, for example, permits the user to adjust the view of the building in the image to a position where the physical object (e.g., edge of the storefront of the business) to be identified by the user in the image is aligned with the market at the horizontal center of the image. The processor 336 is further configured to receive from the user the first identifier along the marker in the first two dimensional image of the first edge of the business relative to the building. The first axis describe above would be directed along the first modified first heading between the first position and the first edge of the polygon representing the building on the map.

The processor 336 is also configured to receiving a second request from the user to change the display of the two dimensional image from the first modified first heading from the first position to a second modified first heading from the first position to, for example, align the marker with the second edge of the storefront of the business. Upon alignment, the processor 336 is configured to receive from the user the second identifier along the marker in the two dimensional image of the second edge of the business relative to the building, wherein the second axis described above is directed along the second modified first heading between the first position and the second edge of the polygon representing the building on the map.

Similarly, the processor 336 is configured to receive a third request from the user to change the display of the two dimensional image from the second modified first heading from the first position to a third modified first heading from the first position to, for example, align the marker with the entrance of the storefront of the business. Upon alignment, the processor 336 is configured to receive from the user the third identifier along the marker in the two dimensional image of the entrance of the business relative to the building, wherein the third axis described above is directed along the third modified first heading between the first position and the third edge of the polygon representing the building on the map.

The location application 322 is also advantageously configured to permit the user to identify physical objects (e.g., edges and entrances of storefronts) in a two-dimensional image that are not in the horizontal center of the image, thereby permitting a user more flexibility and ease in identifying physical objects in images by reducing the need for the user to adjust a view of an image until the physical object to be identified is at the horizontal center of the image. In these aspects, the location application 322 is configured to use the heading and location of the photograph and the distance between the identified physical object and the horizontal center of the photograph to determine the physical location of the identified physical object.

In this regard, when the first identifier of the first edge of the business is received at a first off-center location on the first two dimensional image, and the second identifier of the second edge of the business is received at a second off-center location on the first two dimensional image, and the third identifier of the entrance of the business is received at a third off-center location on the first two dimensional image, then the processor 336 of the server 130 is configured to determine, based on a zoom level of the first two dimensional image and a pixel distance of the first identifier from the horizontal center of the first two dimensional image, a first approximate number of degrees of rotational arc difference for the first identifier from the first heading. Similarly, the processor 336 is configured to determine, based on the zoom level of the first two dimensional image and a pixel distance of the second identifier from the horizontal center of the first two dimensional image, a second approximate number of degrees of rotational arc difference for the second identifier from the first heading, and determine, based on the zoom level of the first two dimensional image and a pixel distance of the third identifier from the horizontal center of the first two dimensional image, a third approximate number of degrees of rotational arc difference for the third identifier from the first heading. The processor 336 is further configured to generate a first modified first heading that differs from the first heading based on the determined first approximate number of degrees of rotational arc difference from the first heading, generate a second modified first heading that differs from the first heading based on the determined second approximate number of degrees of rotational arc difference from the first heading, and generate a third modified first heading that differs from the first heading based on the determined third approximate number of degrees of rotational arc difference from the first heading. In these aspects, the first axis described above is directed along the first modified first heading, the second axis described above is directed along the second modified first heading, and the third axis described above is directed along the third modified first heading.

As an instance of how the location application 322 is advantageously configured to permit the user to identify physical objects (e.g., edges and entrances of storefronts) in a two-dimensional image that are not in the horizontal center of the image, an example with sample locations will now be described with reference to the example illustration 600 of FIG. 6. A photograph 602 of a street view of a business taken by a camera at the latitude and longitude (38.904338837, −77.043243408) and angle of rotation is 90° is provided for display. The information indicates the camera was facing exactly due East originating from the latitude and longitude provided when the photograph was taken. If the user were to select to identify a physical object the exact horizontal center 604 of the viewport of the photograph, an axis line starting at the latitude and longitude of the location of the photograph and directed exactly 90° would relate in the physical world to where the user identified the physical object. However, if the user identified a physical object 606 to the left of the horizontal center 604 of the viewport of the photograph, the actual angle used to cast out the axis may be 87° or 85° even though the camera angle is 90° because the camera is facing toward 90° and their off-center identification means that the axis is not to be cast in the exact direction of the camera, but off to the side. Alternatively, if the user were to identify a physical object to the right of the horizontal center 604, the actual angle used to cast out the axis starting at the latitude and longitude of the location of the photograph may be 93° or 950°.

A series of calculations may be used to translate from the camera angle and the location selected for a physical object in the image to the actual angle used to cast an axis from the position from which a camera took the image. For example, the street view level imagery discussed herein includes, for each view, a series of images taken at different angles stitched together and projected on the inside of a three-dimensional sphere centered around the latitude and longitude of the position of the camera. This allows a user to click and drag to rotate the viewport within that three-dimensional sphere to seamlessly view roads, buildings, and other objects in all directions. Commonly street view tools provide a latitude and longitude of the point from which the photos were taken along with a heading indicating the direction the user is facing. The heading corresponds to the exact horizontal center of the viewport. The disclosed system permits users to be able to identify on the objects of interest (left edge, right edge, entrances) from any position in the street view rather than require the user to rotate the viewport to put the exact horizontal center atop the objects of interest as discussed above. In order to enable such identification on a distorted image projected on the inside of a sphere, the disclosed system translates the user identified arbitrary place (e.g., where the user "clicked") in the image to a heading that is different from the heading provided by the street view tool (e.g., because the street view provides the heading of the exact horizontal center of the viewport and not of the place where the user clicked).

The disclosed system accomplishes this translation by first determining the angle encompassed by the image at each zoom level offered by the street view tool (e.g., the aspect of the location application 322 providing the street level image). For example, when zoomed all the way out, the street view may provide a viewable angle of 90 degrees (45 degrees to the left and to the right of center). When zoomed in a bit more, the viewport is narrowed so the street view may provide a viewable angle of only 60 degrees (30 degrees to the left and to the right of center) and when zoomed in all the way the viewport may narrow so it only provides a viewable angle of 30 degrees (15 degrees to the left and right of the center).

Once the viewable angle provided at each zoom level is determined, the disclosed system determines the extent of distortion at that zoom level. This is achieved by placing markers at known angle spacing in the street view aspect of the location application 322 and determining the level of distortion by fitting the distortion of those markers to a curve. In so doing the location application 322 determines how to translate a click in the viewport to an angle of heading. This results with a set of equations which, for each zoom level, will translate a value x representing the place on the street level imagery where the user clicked into a heading, and the heading is computed by taking the actual camera direction heading and taking into account the image distortion.

In one aspect, the equation will take as inputs: the value X of the location where the user clicked on the street side imagery, the zoom level Z, the heading where the horizontal center of the camera is pointing H. and will output the adjusted heading AH representing the heading in the direction of the click. For example, the service BING STREETSIDE provides three different zoom levels for the street level imagery: zoom level 1—zoomed out all the way, providing an image with a viewable angle of 112 degrees, zoom level 2—middle zoom level, providing an image with a viewable angle of 56 degrees; and zoom level 3—zoomed all the way in, providing an image with a viewable angle of 28 degrees. The location application 322 plots markers at known angle spacing (e.g. 72 markers spaced by 5 degrees each forming a full 360 degree circle) at each zoom level.

In each zoom level, the location application 322 fits the image to a curve to determine how the image is distorted to the left and right of center. The location application 322 calculates an offset equation for each zoom level, applies the inputs, then adds or subtracts the click location to the horizontal center heading (e.g., if the click is to the left of center, it is subtracted from H, but if the click is to the right of center, the click location is added to H).

In order to arrive at X the raw value of where the user clicked on the street level imagery is provided and then the aspect ratio of the viewport is used. This is accomplished by taking the following inputs: the actual horizontal value x in the viewport where the user clicked; the width w of the viewport; the left offset lo of the viewport (how far from the left edge of the browser the map starts); and the height h of the viewport. For the equation, $X=2*(x-w/2-lo)/h$.

X can then be used to determine AH. Given three zoom levels, for zoom level 1, $AH=H (-/-) 52.28707*abs(X)-11.98045*X^2$. For zoom level 2, $AH=H (+/-) 21.74109*abs(X)-1.666212*X^2$. For zoom level 3, AH H $(+/-) 10*abs(X)$. The values (52.28707, -11.98045) are derived from finding the polynomial equation which fits the distortion of the image.

Applying the disclosed equation to exemplary values, where x=444, w=1401, lo=0, and h=1286, then $X=2*(444-1401/2-0)/1286=-0.3989113530326594$. This means, in essence, that the user clicked 39.89% of the way to the left of horizontal center of a street view image. Then, to solve for the actual heading, where H=60.08628567718144,X=-0.3989113530326594, and Z=1, and the click was to the left of center, then the location application 322 will subtract the calculated value from the camera heading. At Z=1, the equation is $AH=60.08628567718144-(52.28707*abs(-0.3989113530326594)-11.98045*(-0.3989113530326594)^2)=60.08628567718144-(20.743390356-1.9064522142)=60.08628567718144-18.955442739134693=41.130842938046754$. The final outcome for actual heading is thus 41.1308. This value represents the angle of heading from the latitude and longitude where the camera is located, out to the location of the click by the user in the street view image.

As noted above, the calculations may be affected by the current zoom level of the photograph. For example, when a camera is fully zoomed out to take a photograph, the viewport of the camera may encompass 110°, so an identification of a physical object on the leftmost side of the viewport may represent 35° (90° minus the 55° to the left that the viewport encompasses) to 145° (90° plus the 55° to the right that the viewport encompasses). However, when the camera is fully zoomed in, the viewport may encompass only 28° so an identification of a physical object on a leftmost side may represent 76° (90° minus the 14° to the left the viewport encompasses) and an identification of a physical object on a rightmost side may represent 104° (90° plus the 14° to the right the viewport encompasses).

Accordingly, based on a zoom level of a camera when taking a photograph or when viewing an image, the number of degrees of rotational arc represented by the image can be determined. Furthermore, based on where a user identifies a physical object in an image, using the pixel estimation algorithm it can be determined with a significant degree of accuracy the heading at which an axis should be cast from the position where the photograph was taken.

It may also be noted that due to the distortion of an image taken by a camera, the location of the physical object that is identified in an image and the angle it represents from the horizontal center of the image is non-linear. Thus, if the viewport of a photograph or camera encompasses 100° of arc and a user identifies a physical object in the photograph halfway between the horizontal center line and the leftmost side of the photograph, it is not accurate to take the heading of the camera and subtract 25° to account for the location of the identified physical object. This would not be inaccurate due to the image distortion and subsequent non-linearity, whereas in fact it would the correct heading would be closer to 33°. The closer to the left edge of the viewport the user identifies a physical object, the smaller each pixel increases the angle.

FIGS. 7A-7F are example illustrations and maps associated with an example tutorial for accurately determining the location, edges, and physical positions of a physical object in a multi-dimensional space using the example client and server of FIG. 2A. The example tutorial is a graphical user interface provided by the location application 322 to teach a user how to interact with two-dimensional photographs of buildings in order to identify edges and entrances of a business in the building by walking the user through the identification of the left edge, right edge, and entrance of at least one exemplary building.

Figure 7A:
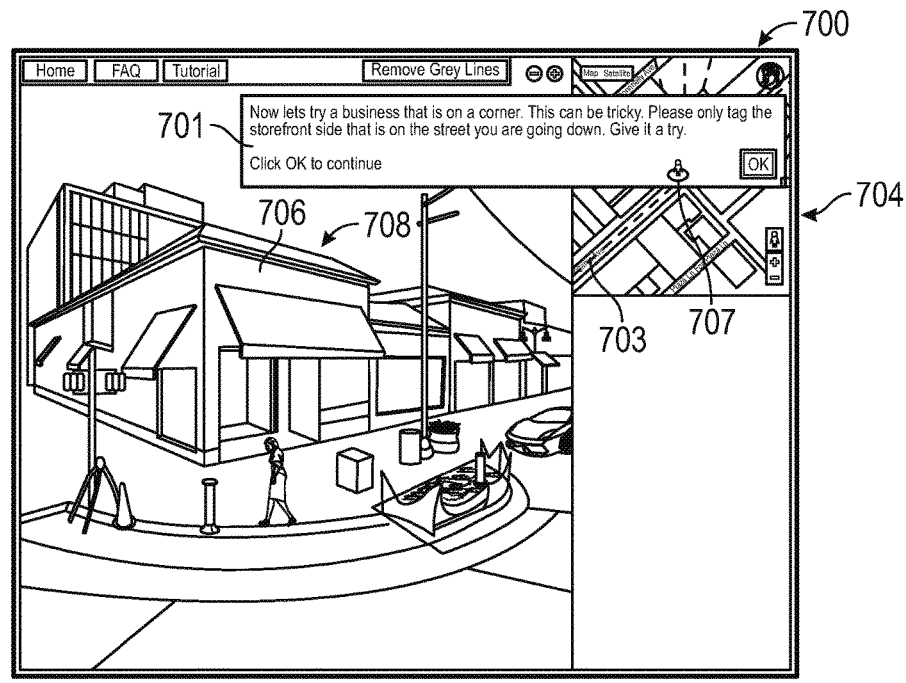
FIGS. 7A-7F are example illustrations and maps associated with the example tutorial for accurately determining the location, edges, and physical positions of a physical object in a multi-dimensional space using the example client and server of FIG. 2A.

As provided in the example illustration 700 of FIG. 7A, the location application 322 provides a graphical user interface with instructions 701 for teaching a user how to identify physical objects in a two-dimensional image using the graphical user interface to facilitate a more accurate location identification by the disclosed system of the physical object on a map. The example photograph provided in FIG. 7A displays a building 708 including a storefront 706. The graphical user interface also displays a map 704 identifying a position 707 from which the photograph was taken, and a street 703 on which storefronts may be displayed to the user to identify edges and entrances.

Figure 7B:
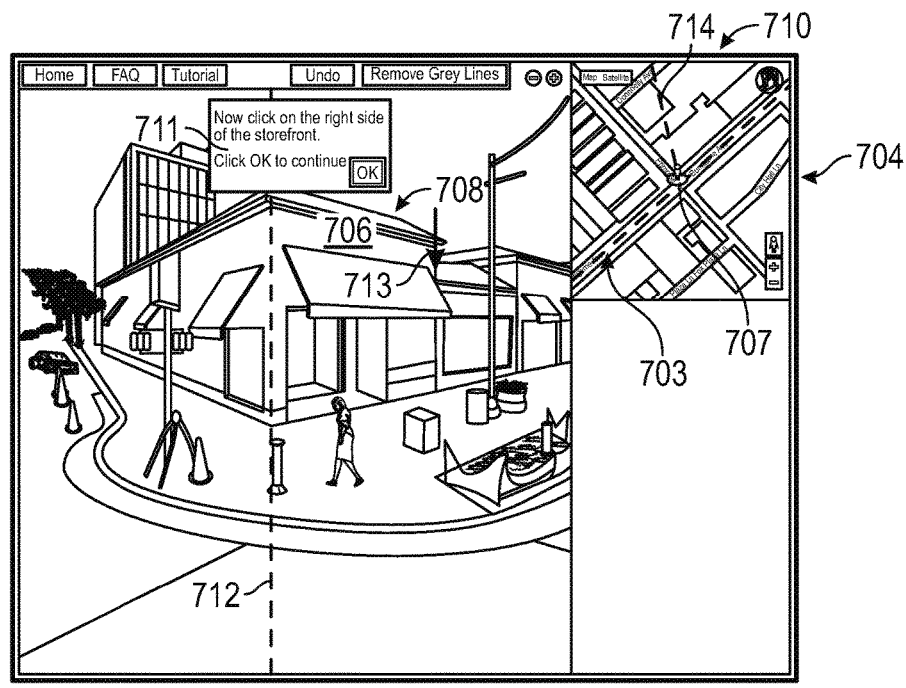

FIG. 7B provides an example illustration 710 of the graphical user interface of a next step in the tutorial subsequent to the step in the illustration 700 of FIG. 7A. The example illustration 710 of FIG. 7B displays instructions 711 after the user has identified a left edge 712 of the storefront 706 in response to an arrow instructing the user that the left edge of the storefront was located in that area of the photograph, and further displays an arrow 713 to identify to the user where in the photograph the user should identify the right side of the storefront 706 of the business in the building 708. As a result of the identification of the left edge 712 of the storefront, a first axis 714 is displayed on the map 704 from the position 707 of the user in the direction of the left edge 712 of the storefront 706.

Figure 7C:
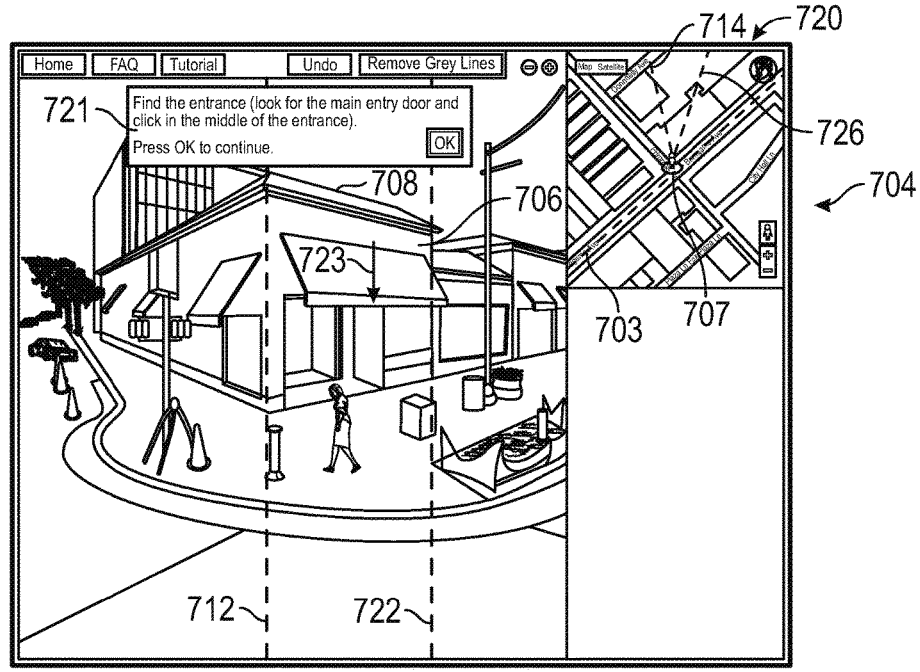

FIG. 7C provides an example illustration 720 of the graphical user interface of a next step in the tutorial subsequent to the step in the illustration 710 of FIG. 7B. The example illustration 720 of FIG. 7C displays instructions 721 after the user has identified both a left edge 712 and a right edge 722 of the storefront 706 in response to arrows instructing the user that the left edge and the right edge of the storefront were located in their respective areas of the photograph. The example illustration 720 displays an arrow 733 to identify to the user where in the photograph the user should identify the entrance of the storefront 706 of the business in the building 708. Furthermore, as a result of the identification of the left edge 712 and right edge 722 of the storefront, a second axis 726 is displayed on the map 704 from the position 707 of the user in the direction of the right edge 722 of the storefront 706.

Figure 7D:
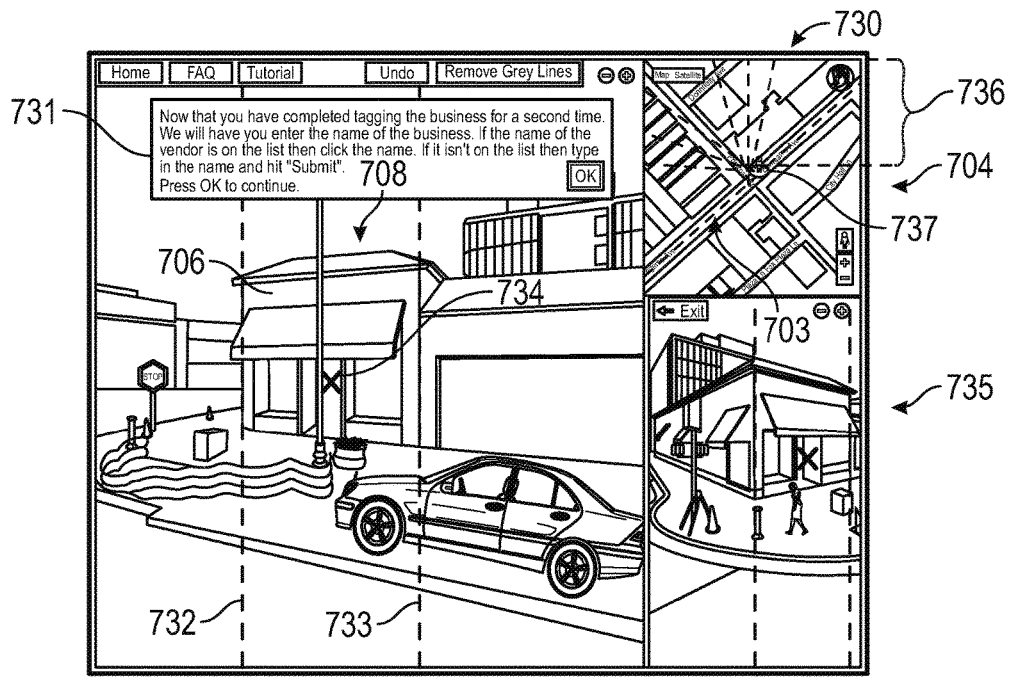

FIG. 7D provides an example illustration 730 of the graphical user interface of a step in the tutorial several steps subsequent to the step in the illustration 720 of FIG. 7C. In the steps of the tutorial prior to the step displayed in the example illustration 730 of FIG. 7D, the user has identified the left edge 732 and the right edge 733 of the storefront 706 of the business using a different street-level photograph of the business taken from a different position than the photograph of FIGS. 7A-7C, but using the approach illustrated in FIGS. 7A-7C. The example illustration 730 also includes instructions 731 for the tutorial. The example illustration 720 displays in a side area 735 the previously displayed street-level photograph of the business with the identifiers of the left side, right side, and entrance of the business as previously identified by the user. The example illustration 720 also displays the map 704 identifying the different position 737 from which the photograph was taken, along with axes 736 from both of the positions from which the street-level photographs were taken in the directions of the identified edges and entrance of the storefront 706.

Figure 7E:
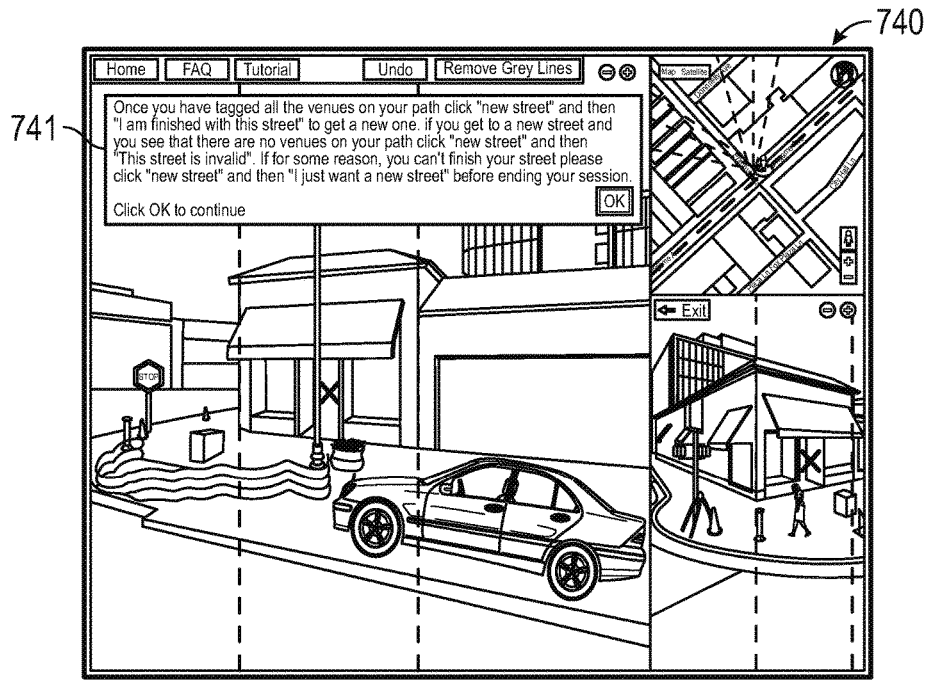

FIG. 7E provides an example illustration 740 of the graphical user interface of a next step in the tutorial subsequent to the step in the illustration 730 of FIG. 7D. The example illustration 740 of FIG. 7D displays instructions 741 for the user to inform a user how to provide identification information for additional businesses on one or additional streets after the user has completed identifying the left and right edges and entrance to storefronts for businesses on a street.

Figure 7F:
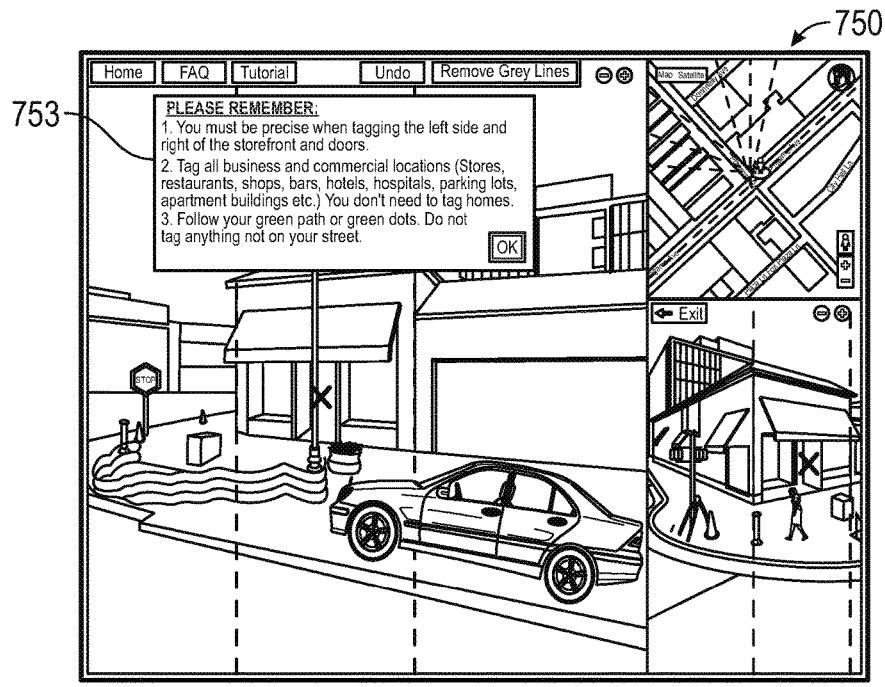

FIG. 7F provides an example illustration 750 of the graphical user interface of a next step in the tutorial subsequent to the step in the illustration 740 of FIG. 7E. The example illustration 750 of FIG. 7E displays instructions 751 for the user to inform a user how to provide location information for additional businesses on one or additional streets after the user has completed identifying the left and right edges and entrance to storefronts for businesses on a street. FIG. 7G provides an example illustration 760 of the graphical user interface of a next step in the tutorial subsequent to the step in the illustration 740 of FIG. 7E, providing additional instructions 753 to the user on how to provide location information for additional businesses on one or additional streets.

Figure 8:
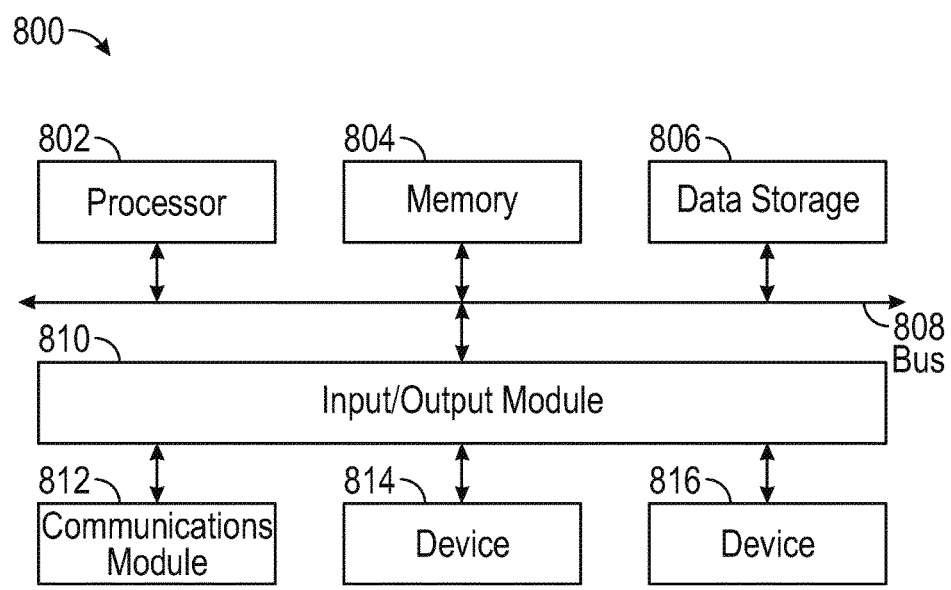
FIG. 8 is a block diagram illustrating an example computer system with which the client and server of FIG. 2A can be implemented.

FIG. 8 is a block diagram illustrating an example computer system 800 with which the client 110 and server of FIG. 2A can be implemented. In certain aspects, the computer system 800 may be implemented using hardware or a combination of software and hardware, either in a dedicated server, or integrated into another entity, or distributed across multiple entities.

Computer system 800 (e.g., clients 110 and server 130) includes a bus 808 or other communication mechanism for communicating information, and a processor 802 (e.g., processor 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 320 and 332), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Example input/output modules 810 include data ports such as USB ports. The input/output module 810 is configured to connect to a communications module 812. Example communications modules 812 (e.g., communications module 318 and 338) include networking interface cards, such as Ethernet cards and modems. In certain aspects, the input/output module 810 is configured to connect to a plurality of devices, such as an input device 814 (e.g., input device 316) and/or an output device 816 (e.g., output device 314). Example input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a LAN, a campus area network (CAN), a metropolitan area network (MAN), a WAN, a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 802 for execution. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that include bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method comprising:
   obtaining, by a device, a first two dimensional image providing a first person perspective, along a first heading from a first position at a first latitude and longitude pairing on a map, of a building comprising a business;
   receiving, by the device, from a user a first identifier in the first two dimensional image of a first edge of the business relative to the building, the first identifier associated with a first axis directed based on the first heading in a direction of the first edge of the business and passing through the first position on the map;
   receiving, by the device, from the user a second identifier in the first two dimensional image of a second edge of the business relative to the building, the second identifier associated with a second axis directed based on the first heading in a direction of the second edge of the business and passing through the first position on the map;
   receiving, by the device, from the user a third identifier in the first two dimensional image of an entrance to the business relative to the building, the third identifier associated with a third axis directed based on the first heading in a direction of the entrance of the business and passing through the first position on the map;
   identifying, by the device, a first point on the first axis and using the first point to identify the first edge of the business in the building on the map;
   identifying, by the device, a second point on the second axis and using the second point to identify the second edge of the business in the building on the map;
   identifying, by the device, a third point on the third axis and using the third point to identify the entrance of the business in the building on the map; and
   providing, by the device, directions between an origin point and a third latitude and longitude pairing, on the map, associated with the entrance to the business.

2. The method of claim 1, wherein the first point comprises an intersection on the map between the first axis and a first edge of a polygon representing the building on the map, wherein the second point comprises an intersection on the map between the second axis and the second edge of the polygon representing the building, and wherein the third point comprises an intersection on the map between the third axis and a third edge of the polygon representing the building, and wherein the first, second, and third edges are a same edge or are different edges of the polygon representing the building.

3. The method of claim 2, wherein the first point, the second point, and the third point are identified by the user viewing the map.

4. The method of claim 2, wherein the first point, the second point, and the third point are identified by a processor identifying each of intersection on the map between the first axis and the first edge of the polygon, the intersection on the map between the second axis and the second edge of the polygon, and the intersection on the map between the third axis and the third edge of the polygon representing the building.

5. The method of claim 1, further comprising:
obtaining a second two dimensional image providing a first person perspective, along a second heading from a second position at a second latitude and longitude pairing on the map, of the building comprising the business;
receiving from the user a fourth identifier in the second two dimensional image of the first edge of the business relative to the building, the fourth identifier associated with a fourth axis directed based on the second heading in the direction of the first edge of the business and passing through the second position on the map;
receiving from the user a fifth identifier in the second two dimensional image of the second edge of the business relative to the building, the fifth identifier associated with a fifth axis directed based on the second heading in the direction of the second edge of the business and passing through the second position on the map; and
receiving from the user a sixth identifier in the second two dimensional image of the entrance to the business relative to the building, the sixth identifier associated with a sixth axis directed based on the second heading in the direction of the entrance of the business and passing through the second position on the map,
wherein the first point is identified as an intersection on the map of the first axis and the fourth axis,
wherein the second point is identified as an intersection on the map of the second axis and the fifth axis, and
wherein the third point is identified as an intersection on the map of the third axis and the sixth axis.

6. The method of claim 1, further comprising providing the map for display to the user or another user, the map comprising an identification on a polygon on a map representing the building of each of the first edge of the business, the second edge of the business, and the entrance of the business.

7. The method of claim 1, further comprising:
receiving a request from another user for directions between the origin point on the map and the business.

8. The method of claim 1, further comprising:
determining a set of boundaries for the business within a polygon representing the building based on the first edge of the business and the second edge of the business;
receiving a location of another user; and
determining based on the boundaries for the business that the other user is located at the business.

9. The method of claim 1, further comprising:
receiving an initial first two dimensional image providing a first person perspective along an initial heading from the first position at the first latitude and longitude pairing on the map; and
receiving a request from the user to change a display of the first two dimensional image from the initial heading from the first position to the first heading from the first position,
wherein the first two dimensional image providing the first person perspective, along the first heading from the first position at the first latitude and longitude pairing on the map, of the building is provided in response to the request from the user to change from the initial heading from the first position to the first heading from the first position.

10. The method of claim 1,
wherein the first identifier of the first edge of the business is received at a first off-center location on the first two dimensional image,
wherein the second identifier of the second edge of the business is received at a second off-center location on the first two dimensional image,
wherein the third identifier of the entrance of the business is received at a third off-center location on the first two dimensional image, and
wherein the method further comprises:
determining, based on a zoom level of the first two dimensional image and a pixel distance of the first identifier from a horizontal center of the first two dimensional image, a first approximate number of degrees of rotational arc difference for the first identifier from the first heading;
determining, based on the zoom level of the first two dimensional image and a pixel distance of the second identifier from the horizontal center of the first two dimensional image, a second approximate number of degrees of rotational arc difference for the second identifier from the first heading;
determining, based on the zoom level of the first two dimensional image and a pixel distance of the third identifier from the horizontal center of the first two dimensional image, a third approximate number of degrees of rotational arc difference for the third identifier from the first heading;
generating a first modified first heading that differs from the first heading based on the determined first approximate number of degrees of rotational arc difference from the first heading;
generating a second modified first heading that differs from the first heading based on the determined second approximate number of degrees of rotational arc difference from the first heading; and
generating a third modified first heading that differs from the first heading based on the determined third approximate number of degrees of rotational arc difference from the first heading,
wherein the first axis is directed along the first modified first heading, wherein the second axis is directed along the second modified first heading, and
wherein the third axis is directed along the third modified first heading.

11. The method of claim 1, further comprising:
providing for display a marker at a horizontal center of the first two dimensional image;
receiving a first request from the user to change a display of the first two dimensional image from the first heading from the first position to a first modified first heading from the first position;
receiving from the user the first identifier along the marker in the first two dimensional image of the first edge of the business relative to the building, wherein the first axis is directed along the first modified first heading in the direction of the first edge of the business and passing through the first position on the map;
receiving a second request from the user to change the display of the first two dimensional image from the first modified first heading from the first position to a second modified first heading from the first position;
receiving from the user the second identifier along the marker in the first two dimensional image of the second edge of the business relative to the building, wherein the second axis is directed along the second modified first heading in the direction of the second edge of the business and passing through the first position on the map;

receiving a third request from the user to change the display of the first two dimensional image from the second modified first heading from the first position to a third modified first heading from the first position; and receiving from the user the third identifier along the marker in the first two dimensional image of the entrance of the business relative to the building, wherein the third axis is directed along the third modified first heading in the direction of the entrance of the business and passing through the first position on the map.

12. The method of claim 1, further comprising updating a display of edges of a polygon representing the building on the map based on the identified first point, the identified second point, and the identified third point used to identify the first edge, the second edge, the entrance of the business in the building on the map.

13. The method of claim 1, further comprising:

receiving from the user a fourth identifier in the first two dimensional image of another entrance to the business relative to the building, the fourth identifier associated with a fourth axis directed based on the first heading in a direction of the other entrance of the business and passing through the first position on the map; and identifying a fourth point on the fourth axis and using the fourth point to identify the other entrance of the business in the building on the map, wherein the first edge, the second edge, a third edge, and a fourth edge are a same edge or are different edges of a polygon representing the building on the map.

14. A system for improving data accuracy in a positioning system database, the system comprising:

a memory comprising instructions; and a processor configured to execute the instructions to:

obtain a first two dimensional image providing a first person perspective, along a first heading from a first position at a first latitude and longitude pairing on a map, of a building comprising a business;

receive from a user a first identifier in the first two dimensional image of a first edge of the business relative to the building, the first identifier associated with a first axis directed based on the first heading in a direction of the first edge of the business and passing through the first position on the map;

receive from the user a second identifier in the first two dimensional image of a second edge of the business relative to the building, the second identifier associated with a second axis directed based on the first heading in a direction of the second edge of the business and passing through the first position on the map;

receive from the user a third identifier in the first two dimensional image of an entrance to the business relative to the building, the third identifier associated with a third axis directed based on the first heading in a direction of the entrance of the business and passing through the first position on the map;

obtain a second two dimensional image providing a first person perspective, along a second heading from a second position at a second latitude and longitude pairing on the map, of the building comprising the business;

receive from the user a fourth identifier in the second two dimensional image of the first edge of the business relative to the building, the fourth identifier associated with a fourth axis directed based on the second heading in the direction of the first edge of the business and passing through the second position on the map;

receive from the user a fifth identifier in the second two dimensional image of the second edge of the business relative to the building, the fifth identifier associated with a fifth axis directed based on the second heading in the direction of the second edge of the business and passing through the second position on the map;

receive from the user a sixth identifier in the second two dimensional image of the entrance to the business relative to the building, the sixth identifier associated with a sixth axis directed based on the second heading in the direction of the entrance of the business and passing through the second position on the map;

identify, as the first edge of the business in the building, a first point on the first axis comprising an intersection on the map between the first axis and the fourth axis;

identify, as the second edge of the business in the building, a second point on the second axis comprising an intersection on the map between the second axis and the fifth axis;

identify, as the entrance of the business in the building, a third point on the third axis comprising an intersection on the map between the third axis and the sixth axis; and provide directions between an origin point and a third latitude and longitude pairing, on the map, associated with the entrance to the business.

15. The system of claim 14, wherein the first identifier of the first edge of the business is received at a first off-center location on the first two dimensional image, wherein the second identifier of the second edge of the business is received at a second off-center location on the first two dimensional image, wherein the third identifier of the entrance of the business is received at a third off-center location on the first two dimensional image, wherein the fourth identifier of the first edge of the business is received at a fourth off-center location on the second two dimensional image, wherein the fifth identifier of the second edge of the business is received at a fifth off-center location on the second two dimensional image, wherein the sixth identifier of the entrance of the business is received at a sixth off-center location on the second two dimensional image, and wherein the processor is further configured to:

determine, based on a zoom level of the first two dimensional image and a pixel distance of the first identifier from a horizontal center of the first two dimensional image, a first approximate number of degrees of rotational arc difference for the first identifier from the first heading;

determine, based on the zoom level of the first two dimensional image and a pixel distance of the second identifier from the horizontal center of the first two dimensional image, a second approximate number of degrees of rotational arc difference for the second identifier from the first heading;

determine, based on the zoom level of the first two dimensional image and a pixel distance of the third identifier from the horizontal center of the first two dimensional image, a third approximate number of degrees of rotational arc difference for the third identifier from the first heading;

determine, based on a zoom level of the second two dimensional image and a pixel distance of the fourth identifier from a horizontal center of the second two dimensional image, a fourth approximate number of degrees of rotational arc difference for the fourth identifier from the second heading;

determine, based on the zoom level of the second two dimensional image and a pixel distance of the fifth identifier from the horizontal center of the second two dimensional image, a fifth approximate number of degrees of rotational arc difference for the fifth identifier from the second heading;

determine, based on the zoom level of the second two dimensional image and a pixel distance of the sixth identifier from the horizontal center of the second two dimensional image, a sixth approximate number of degrees of rotational arc difference for the sixth identifier from the second heading;

generate a first modified first heading that differs from the first heading based on the determined first approximate number of degrees of rotational arc difference from the first heading;

generate a second modified first heading that differs from the first heading based on the determined second approximate number of degrees of rotational arc difference from the first heading;

generate a third modified first heading that differs from the first heading based on the determined third approximate number of degrees of rotational arc difference from the first heading;

generate a first modified second heading that differs from the second heading based on the determined fourth approximate number of degrees of rotational arc difference from the second heading;

generate a second modified second heading that differs from the second heading based on the determined fifth approximate number of degrees of rotational arc difference from the second heading; and generate a third modified second heading that differs from the second heading based on the determined sixth approximate number of degrees of rotational arc difference from the second heading, wherein the first axis is directed along the first modified first heading, wherein the second axis is directed along the second modified first heading, wherein the third axis is directed along the third modified first heading, wherein the fourth axis is directed along the first modified second heading, wherein the fifth axis is directed along the second modified second heading, and wherein the sixth axis is directed along the third modified second heading.

16. The system of claim 14, wherein the processor is further configured to provide the map for display to the user or another user, the map comprising an identification on a polygon representing the building on the map of each of the first edge of the business, the second edge of the business, and the entrance of the business.

17. The system of claim 14, wherein the processor is further configured to:
receive a request from another user for directions between the origin point on the map and the business.

18. The system of claim 14, wherein the processor is further configured to:
determine a set of boundaries for the business within a polygon representing the building on the map based on the first edge of the business and the second edge of the business;
receive a location of another user; and
determine based on the boundaries for the business that the other user is located at the business.

19. The system of claim 14, wherein the processor is further configured to:
receive an initial first two dimensional image providing a first person perspective along an initial heading from the first position at the first latitude and longitude pairing on the map; and
receive a request from the user to change a display of the first two dimensional image from the initial heading from the first position to the first heading from the first position,
wherein the first two dimensional image providing the first person perspective, along the first heading from the first position at the first latitude and longitude pairing on the map, of the building is provided in response to the request from the user to change from the initial heading from the first position to the first heading from the first position.

20. A non-transitory computer-readable medium storing instructions, the instructions comprising:
one or more instructions that, when executed by one or more processors, cause the one or more processors to:
obtain a first two dimensional image providing a first person perspective, along a first heading from a first position at a first latitude and longitude pairing on a map, of a building comprising a business;
receive from a user a first identifier, at a first off-center location in the first two dimensional image, of a first edge of the business relative to the building;
determine, based on a zoom level of the first two dimensional image and a pixel distance of the first identifier from a horizontal center of the first two dimensional image, a first approximate number of degrees of rotational arc difference for the first identifier from the first heading;
generate a first modified first heading that differs from the first heading based on the determined first approximate number of degrees of rotational arc difference from the first heading;
identify a first axis directed based on the first modified first heading and passing through the first position on the map;
receive from the user a second identifier, at a second off-center location in the first two dimensional image, of a second edge of the business relative to the building;
determine, based on a zoom level of the first two dimensional image and a pixel distance of the second identifier from the horizontal center of the first two dimensional image, a second approximate number of degrees of rotational arc difference for the second identifier from the first heading;

generate a second modified first heading that differs from the first heading based on the determined second approximate number of degrees of rotational arc difference from the first heading;

identify a second axis directed based on the second modified first heading and passing through the first position on the map;

receive from the user a third identifier, at a third off-center location in the first two dimensional image, of an entrance to the business relative to the building;

determine, based on a zoom level of the first two dimensional image and a pixel distance of the third identifier from the horizontal center of the first two dimensional image, a third approximate number of degrees of rotational arc difference for the third identifier from the first heading;

generate a third modified first heading that differs from the first heading based on the determined third approximate number of degrees of rotational arc difference from the first heading;

identify a third axis directed based on the third modified first heading and passing through the first position on the map;

obtain a second two dimensional image providing a first person perspective, along a second heading from a second position at a second latitude and longitude pairing on the map, of the building comprising the business;

receive from the user a fourth identifier, at a fourth off-center location in the second two dimensional image, of the first edge of the business relative to the building;

determine based on a zoom level of the second two dimensional image and a pixel distance of the fourth identifier from the horizontal center of the second two dimensional image, a fourth approximate number of degrees of rotational arc difference for the fourth identifier from the second heading;

generate a first modified second heading that differs from the second heading based on the determined fourth approximate number of degrees of rotational arc difference from the second heading;

identify a fourth axis directed based on the first modified second heading and passing through the second position on the map;

receive from the user a fifth identifier, at a fifth off-center location in the second two dimensional image, of the second edge of the business relative to the building;

determine based on a zoom level of the second two dimensional image and a pixel distance of the fifth identifier from the horizontal center of the second two dimensional image, a fifth approximate number of degrees of rotational arc difference for the fifth identifier from the second heading;

generate a second modified second heading that differs from the second heading based on the determined fifth approximate number of degrees of rotational arc difference from the second heading;

identify a fifth axis directed based on the second modified second heading and passing through the second position on the map;

receive from the user a sixth identifier, at a sixth off-center location in the second two dimensional image, of the entrance to the business relative to the building, determining, based on a zoom level of the second two dimensional image and a pixel distance of the sixth identifier from the horizontal center of the second two dimensional image, a sixth approximate number of degrees of rotational arc difference for the sixth identifier from the second heading;

generate a third modified second heading that differs from the second heading based on the determined sixth approximate number of degrees of rotational arc difference from the second heading;

identify a sixth axis directed based on the third modified second heading and passing through the second position on the map;

identify, as the first edge of the business in the building, a first point on the first axis comprising an intersection on the map between the first axis and the fourth axis;

identify, as the second edge of the business in the building, a second point on the second axis comprising an intersection on the map between the second axis and the fifth axis;

identify, as the entrance of the business in the building, a third point on the third axis comprising an intersection on the map between the third axis and the sixth axis; and provide directions between an origin point and a third latitude and longitude pairing, on the map, associated with the entrance to the business.

* * * * *